United States Patent
Eftekhari Far et al.

(10) Patent No.: US 10,724,346 B2
(45) Date of Patent: Jul. 28, 2020

(54) SIMPLIFIED GEOMECHANICAL MODEL OF STRESSES ON AN ORTHORHOMBIC MEDIA

(71) Applicant: Halliburton Energy Services, Inc., Houston, TX (US)

(72) Inventors: Mehdi Eftekhari Far, Humble, TX (US); John Andrew Quirein, Georgetown, TX (US); Natasa Mekic, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 434 days.

(21) Appl. No.: 15/547,956

(22) PCT Filed: Mar. 31, 2015

(86) PCT No.: PCT/US2015/023645
§ 371 (c)(1),
(2) Date: Aug. 1, 2017

(87) PCT Pub. No.: WO2016/159987
PCT Pub. Date: Oct. 6, 2016

(65) Prior Publication Data
US 2018/0030815 A1 Feb. 1, 2018

(51) Int. Cl.
*E21B 41/00* (2006.01)
*E21B 43/26* (2006.01)
(Continued)

(52) U.S. Cl.
CPC .......... *E21B 41/0092* (2013.01); *E21B 43/26* (2013.01); *E21B 49/00* (2013.01);
(Continued)

(58) Field of Classification Search
CPC ............... F01D 25/002; G06F 17/5009; F05D 2270/11; F05D 2270/71
See application file for complete search history.

(56) References Cited

U.S. PATENT DOCUMENTS 6,098,021 A 8/2000 Tang et al.
2007/0294034 A1 12/2007 Bratton et al.
(Continued)

FOREIGN PATENT DOCUMENTS

WO 2014/105659 A1 7/2014
WO 2016/099488 A1 6/2016

OTHER PUBLICATIONS

Higgins, Shannon, et al. "Anisotropic stress models improve completion design in the Baxter Shale." SPE Annual Technical Conference and Exhibition. Society of Petroleum Engineers, 2008.
(Continued)

*Primary Examiner* — Rehana Perveen
*Assistant Examiner* — Steven W Crabb
(74) *Attorney, Agent, or Firm* — John W. Wustenberg; Baker Botts L.L.P.

(57) ABSTRACT

In accordance with embodiments of the present disclosure, a simplified geomechanical model that considers the anisotropic (e.g., directional) properties of a formation and the presence of natural fractures in the formation is provided. A system and method may be designed according to the present disclosure to create a simplified geomechanical model of a horizontally laminated formation that includes pre-existing natural fractures. The simplified geomechanical model can be used to calculate the fracture closure pressure of the formation and to design a fracturing operation for injecting fracture fluid into the formation, thus improving the efficiency of a subterranean operation. The disclosed model may provide a more realistic model for fractured shales than an isotropic or vertically transverse isotropic (VTI) model. In addition, the disclosed model may be simpler to implement than a full orthorhombic model.

20 Claims, 19 Drawing Sheets

(51) Int. Cl.
- *E21B 49/00* (2006.01)
- *G01V 1/40* (2006.01)
- *G01V 99/00* (2009.01)
- *G06F 17/12* (2006.01)
- *E21B 49/02* (2006.01)

(52) U.S. Cl.
CPC .............. *G01V 1/40* (2013.01); *G01V 99/005* (2013.01); *G06F 17/12* (2013.01); *E21B 49/02* (2013.01); *G01V 2210/6242* (2013.01)

(56) References Cited

U.S. PATENT DOCUMENTS

| | | | | |
|---|---|---|---|---|
| 2010/0312534 | A1* | 12/2010 | Xu | G01V 1/50 703/2 |
| 2011/0125471 | A1 | 5/2011 | Craig et al. | |
| 2014/0278316 | A1 | 9/2014 | Dusterhoft et al. | |
| 2016/0290113 | A1* | 10/2016 | Kisra | E21B 49/00 |
| 2016/0357883 | A1* | 12/2016 | Weng | E21B 43/26 |

OTHER PUBLICATIONS

International Search Report and Written Opinion issued in related PCT Application No. PCT/US2015/023645 dated Dec. 10, 2015, 15 pages.

Far, Mehdi E., Leon Thomsen, and Colin M. Sayers. "Seismic characterization of reservoirs with asymmetric fractures." Geophysics (2013).

Hudson, J. A. "Overall properties of a cracked solid." Mathematical Proceedings of the Cambridge Philosophical Society. vol. 88. No. 2. Cambridge University Press, 1980.

Hudson, John A. "Wave speeds and attenuation of elastic waves in material containing cracks." Geophysical Journal International 64.1 (1981): 133-150.

Thomsen, Leon. Understanding seismic anisotropy in exploration and exploitation. Society of Exploration Geophysicists, 2014.

* cited by examiner

SIMPLIFIED GEOMECHANICAL MODEL OF STRESSES ON AN ORTHORHOMBIC MEDIA

CROSS-REFERENCE TO RELATED APPLICATION

The present application is a U.S. National Stage Application of International Application No. PCT/US2015/023645 filed Mar. 31, 2015, which is incorporated herein by reference in its entirety for all purposes.

TECHNICAL FIELD

The present disclosure relates generally to hydrocarbon recovery operations and, more particularly, to a simplified geomechanical model of the stresses on an orthorhombic media for use during a subterranean operation.

BACKGROUND

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

While performing subterranean operations, it is often desirable to fracture the formation to enhance the production of natural resources. In a hydraulic fracturing operation, a pressurized fracturing fluid may be used to create and propagate a fracture within the formation. Such fracturing operations can be performed in horizontal wellbores drilled through shale reservoirs.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
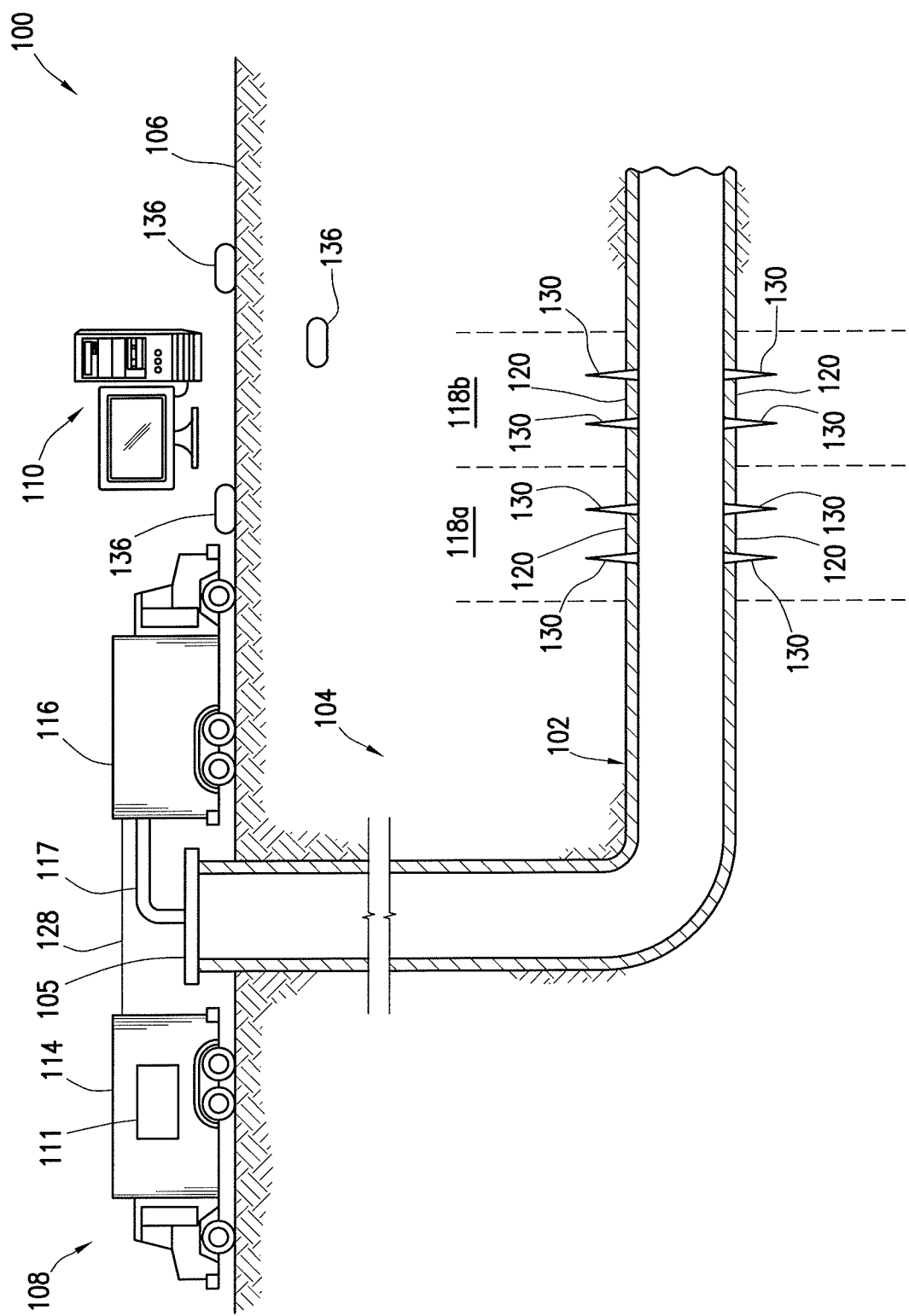
FIG. 1 is an elevation view of a subterranean operations system used in an illustrative wellbore environment, in accordance with an embodiment of the present disclosure.

Illustrative embodiments of the present disclosure are described in detail herein. In the interest of clarity, not all features of an actual implementation are described in this specification. It will, of course, be appreciated that in the development of any such actual embodiment, numerous implementation-specific decisions must be made to achieve developers' specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for generating and utilizing a simplified geomechanical model of stresses on an orthorhombic media for use during a subterranean operation. The disclosed embodiments may provide a relatively accurate model for computing anisotropic mechanical properties of fractured shales (i.e., porous rock), and this model may be relatively easy to generate based on sensor measurements taken of the formation.

During a subterranean operation, pressurized fracturing fluid may be injected into a wellbore to create fractures in a subterranean formation to increase the rate of production of natural resources, such as oil and gas. Fractures in the formation may be created when the pressure of the fracturing fluid is greater than the fracture closure pressure of the subterranean formation. The fracture closure pressure may be calculated using a geomechanical model of the formation based on the properties of the formation. In some subterranean operations, the formation may be a horizontally laminated material, such as shale. When selecting completion zones to perform fracturing operations, it is often desirable to identify locations of shale reservoirs that include pre-existing fractures in relatively high densities. However, the pre-fractured shale reservoirs often have anisotropic mechanical properties (i.e., different properties in different directions) that make it difficult to estimate an appropriate pumping pressure.

The simplified geomechanical model includes consideration of the anisotropic (e.g., directional) properties of the formation and the presence of natural fractures in the formation. A system and method may be designed according to the present disclosure to create a simplified geomechanical model of a horizontally laminated formation that includes pre-existing natural fractures. The simplified geomechanical model can be used to calculate the fracture closure pressure and the pressure of the fracturing fluid, thus improving the efficiency of a subterranean operation.

The disclosed model may provide a more realistic model for fractured shales than an isotropic or vertically transverse isotropic (VTI) model. In addition, the disclosed model may be simpler to implement than a "full" orthorhombic model. The full orthorhombic model may be complicated and involve large numbers of mechanical measurements taken to create the model for a given formation. The disclosed simplified model, however, may be created using fewer measurements than the full orthorhombic model to compute the desired fracture closure pressure.

FIG. 1 illustrates an elevation view of an example embodiment of a well system 100 used in an illustrative wellbore environment. The well system 100 may include a wellbore 102 in a subterranean region 104 beneath a ground surface 106. The wellbore 102, as shown in FIG. 1, may include a horizontal wellbore. However, the well system 100 may include any combination of horizontal, vertical, slant, curved, or other wellbore orientations. The well system 100 may include one or more additional treatment wells, observation wells, or other types of wells. The subterranean region 104 may include a reservoir that contains hydrocarbon resources, such as oil, natural gas, or others. For example, the subterranean region 104 may include all or part of a rock formation (e.g., shale, coal, sandstone, granite, or others) that contains natural gas. The subterranean region 104 may include naturally fractured rock or natural rock formations that are not fractured to any significant degree. The subterranean region 104 may include tight gas formations of low permeability rock (e.g., shale, coal, or others).

The well system 100 may also include an injection system 108. In some embodiments, the injection system 108 may perform a treatment, for example, by injecting fluid into the subterranean region 104 through the wellbore 102. In some embodiments, a treatment fractures part of a rock formation or other materials in the subterranean region 104. In such examples, fracturing a rock may increase the surface area of a formation, which may increase the rate at which the formation conducts hydrocarbon resources to the wellbore 102.

The injection system 108 may be used to perform one or more treatments including, for example, injection treatments or flow back treatments. The injection system 108 may apply treatments including single-stage injection treatments, multi-stage injection treatments, mini-fracture test treatments, follow-on fracture treatments, re-fracture treatments, final fracture treatments, other types of fracture treatments, or any suitable combination of treatments. An injection treatment may be a multi-stage injection treatment where an individual injection treatment is performed during each stage. A treatment may be applied at a single injection location or at multiple injection locations in the subterranean region, and fluid may be injected over a single time period or multiple different time periods. A treatment may use multiple fluid injection locations in a single wellbore, multiple fluid injection locations in multiple different wellbores, or any suitable combination. Moreover, a treatment may inject fluid through any suitable type of wellbore, such as, for example, vertical wellbores, slant wellbores, horizontal wellbores, curved wellbores, or any suitable combination of these and others.

The injection system 108 may inject treatment fluid into the subterranean region 104 through the wellbore 102. The injection system 108 may include an instrument truck 114, a pump truck 116, and an injection treatment control subsystem 111. The injection system 108 may include other features not shown. Although FIG. 1 depicts a single instrument truck 114 and a single pump truck 116, any suitable number of these trucks 114 and 116 may be used.

The pump trucks 116 may communicate treatment fluids into the wellbore 102, for example, through a conduit 117, at or near the level of the ground surface 106. The pump trucks 116 may include mobile vehicles, immobile installations, skids, hoses, tubes, fluid tanks, fluid reservoirs, pumps, valves, mixers, or other types of structures and equipment. The pump trucks 116 may supply treatment fluid or other materials for a treatment. The pump trucks 116 may contain multiple different treatment fluids, proppant materials, or other materials for different stages of a treatment. Treatment fluids may be communicated through the wellbore 102 from the ground surface 106 level by a conduit installed in the wellbore 102. The conduit may include casing cemented to the wall of the wellbore 102. In some embodiments, all or a portion of the wellbore 102 may be left open, without casing. The conduit may include a working string, coiled tubing, sectioned pipe, or other types of conduit.

The instrument trucks 114 may include an injection treatment control subsystem 111, which controls or monitors the treatment applied by the injection system 108. The instrument trucks 114 may include mobile vehicles, immobile installations, or other suitable structures. The injection treatment control subsystem 111 may control operation of the injection system 108. The injection treatment control subsystem 111 may include data processing equipment, communication equipment, or other systems that control stimulation treatments applied to the subterranean region 104 through the wellbore 102. The injection treatment control subsystem 111 may include or be communicatively coupled to a computing system (e.g., computing subsystem 110) that calculates, selects, or optimizes treatment parameters for initialization, propagation, or opening fractures in the subterranean region 104. The injection treatment control subsystem 111 may receive, design, or modify a stimulation treatment plan (e.g., a pumping schedule) that specifies properties of a treatment to be applied to the subterranean region 104.

The injection system 108 may use multiple treatment stages or intervals, such as a first stage 118a and a second stage 118b (collectively "stages 118"). The injection system 108 may delineate fewer stages or multiple additional stages beyond the two stages 118 shown in FIG. 1. The stages 118 may each have one or more perforation clusters 120 that include one or more perforations. Fractures in the subterranean region 104 may be initiated at or near the perforation clusters 120 or elsewhere. The stages 118 may have different widths or may be uniformly distributed along the wellbore 102. The stages 118 may be distinct, nonoverlapping (or overlapping) injection zones along the wellbore 102. In some embodiments, each stage 118 may be isolated from the other stages 118, for example, by packers or other types of seals in the wellbore 102. In some embodiments, each stage 118 may be treated individually, for example, in series along the wellbore 102. The injection system 108 may perform identical, similar, or different injection treatments at the different stages 118.

A treatment, as well as other activities and natural phenomena, may generate microseismic events in the subterranean region 104. For example, the injection system 108 may cause multiple microseismic events during a multi-stage injection treatment. Microseismic data may be collected from the subterranean region 104. Microseismic data detected in the well system 100 may include acoustic signals generated by natural phenomena, acoustic signals associated with a stimulation treatment applied through the wellbore 102, or other types of signals. For instance, sensors 136 may detect formation properties, such as acoustic signals generated by rock slips, rock movements, rock fractures or other events in the region 104. Microseismic events in the region 104 may occur, for example, along or near induced hydraulic fractures. The microseismic events may be associated with pre-existing natural fractures or hydraulic fracture planes induced by fracturing activities. Microseismic data from a stimulation treatment may include information collected before, during, or after fluid injection.

The well system 100 may include the sensors 136, microseismic array, and other equipment that may be used to detect microseismic data. The sensors 136 may include geophones or other types of listening equipment. The sensors 136 may be located at a variety of positions in the well system 100. As shown in FIG. 1, the sensors 136 may be installed at the surface 106 and beneath the surface 106 (e.g., in an observation well (not shown)). Additionally or alternatively, the sensors 136 may be positioned in other locations above or below the ground surface 106, in other locations within the wellbore 102, or within another wellbore (e.g., another treatment well or an observation well). The wellbore 102 may include additional equipment (e.g., working string, packers, casing, or other equipment) not shown in FIG. 1.

Other sensors 136 may be utilized either downhole or at the surface 106 to measure parameters used to generate a simplified geomechanical model. In some embodiments the sensors 136 may include one or more ultrasonic transducers that may be positioned downhole to take ultrasonic measurements (e.g., velocity measurements of compression waves and shear waves) along the wellbore 102. These ultrasonic measurements may be analyzed by the computing subsystem 110 to create simplified models representing the anisotropic mechanical properties of the different formation stages 118. These ultrasonic sensors may be disposed on logging tools that are either incorporated with the drilling system used to form the wellbore 102 or lowered downhole to take measurements after drilling of the wellbore 102 is completed.

In some embodiments, the sensors 136 may be used above the surface 106 during mechanical testing of one or more samples taken from the different stages 118 of the formation 104. For example, the sensors 136 may include one or more strain gauges, tensile testers, or other measuring devices used to measure stresses/strains and to determine various mechanical properties (e.g., Young's modulus, Poisson's ratio) of the formation samples. These measurements may be analyzed by the computing subsystem 110 to create simplified models representing the anisotropic mechanical properties of the different formation stages 118. This mechanical testing may be performed in a lab environment at the surface 106 using samples of the formation 104 retrieved from downhole via a formation sampler tool.

The sensors 136 described above may be used to detect microseismic events, ultrasonic wave velocities along the wellbore 102, and/or stresses/strains of formation samples, and to collect and transmit the sensor data, for example, to the computing subsystem 110. The computing subsystem 110 may be located above ground surface 106. The computing subsystem 110 may include one or more computing devices or systems located at the wellbore 102, or in other locations. The computing subsystem 110 or any of its components may be located apart from the other components shown in FIG. 1. For example, the computing subsystem 110 may be located at a data processing center, a computing facility, a lab where testing is being performed, or another suitable location. In some cases, all or part of the computing subsystem 110 may be contained in a technical command center at a well site, in a real-time operations center at a remote location, in another appropriate location, or any suitable combination of these.

The well system 100 and the computing subsystem 110 may include or access any suitable communication infrastructure. Communication links 128 may allow the instrument trucks 114 to communicate with the pump trucks 116, or other equipment at the ground surface 106. Additional communication links may allow the instrument trucks 114 to communicate with sensors or data collection apparatus in the well system 100, remote systems, other well systems, equipment installed in the wellbore 102, or other devices and equipment. For example, the well system 100 may include multiple separate communication links or a network of interconnected communication links. These communication links may include wired or wireless communications systems. For example, the sensors 136 may communicate with the instrument trucks 114 or the computing subsystem 110 through wired or wireless links or networks, or the instrument trucks 114 may communicate with the computing subsystem 110 through wired or wireless links or networks. These communication links may include a public data network, a private data network, satellite links, dedicated communication channels, telecommunication links, or any suitable combination of these and other communication links.

In some embodiments, the formation 104 may be a horizontally laminated, or layered, media, such as shale. The lamination of the formation 104 may introduce directional dependency into the physical properties of the formation 104. A horizontally laminated media which includes one or two sets of vertical and orthogonal natural fractures may be modeled as an orthorhombic media where the mechanical properties of the media may be directionally dependent. In some embodiments, the formation 104 may include natural fractures that run vertically through the formation 104, due to the stresses on the subsurface formations. The natural fractures may include one or two sets of vertical fractures where one set of natural fractures may be orthogonal, or at right angles, to the other set of natural fractures.

The formation 104 may include natural fractures that may be created by stresses in the formation 104. The stresses in the formation 104 may be due to plate tectonics and may create unequal stresses in different directions (e.g., stress anisotropy). The horizontal stresses may create vertical natural fractures. During a subterranean operation, the formation 104 may be fractured to increase the production of natural resources (e.g., oil, and/or gas) from the formation 104. A high-pressure fracturing fluid may be pumped downhole through any suitable tubing in the wellbore 102 and used to create fractures 130. The stresses in the formation 104 caused by the natural fractures may act to force the fractures 130 to collapse or close. This stress may be referred to as the "fracture closure pressure." Therefore, to create the fracture 130, the pressure of the fracturing fluid may be selected based on the stresses in the formation 104 such that the pressure of the fracturing fluid is higher than the closure pressure of the formation 104.

It may be desirable to control a pressure of the fracturing fluid pumped downhole within an appropriate range. If the fracturing fluid is pumped at too high a pressure, this may result in a high-cost fracturing process and/or may extend the fractures 130 too far into the formation 104. If the fracturing fluid is pumped at too low a pressure, this may prevent the process from forming or propagating the fractures 130 enough to increase hydrocarbon production.

A geomechanical model of the stresses in the formation 104 may be used to determine the fracture closure pressure of the formation 104 which may be used to select the pressure (or pressure range) for the fracturing fluid. As such, the geomechanical model designed according to the present disclosure may increase the efficiency and effectiveness of a subterranean operation, as discussed in further detail below.

The well system 100 may include additional or different features than those shown. The features of the well system 100 may be arranged as shown in FIG. 1, or in another suitable configuration. Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 2:
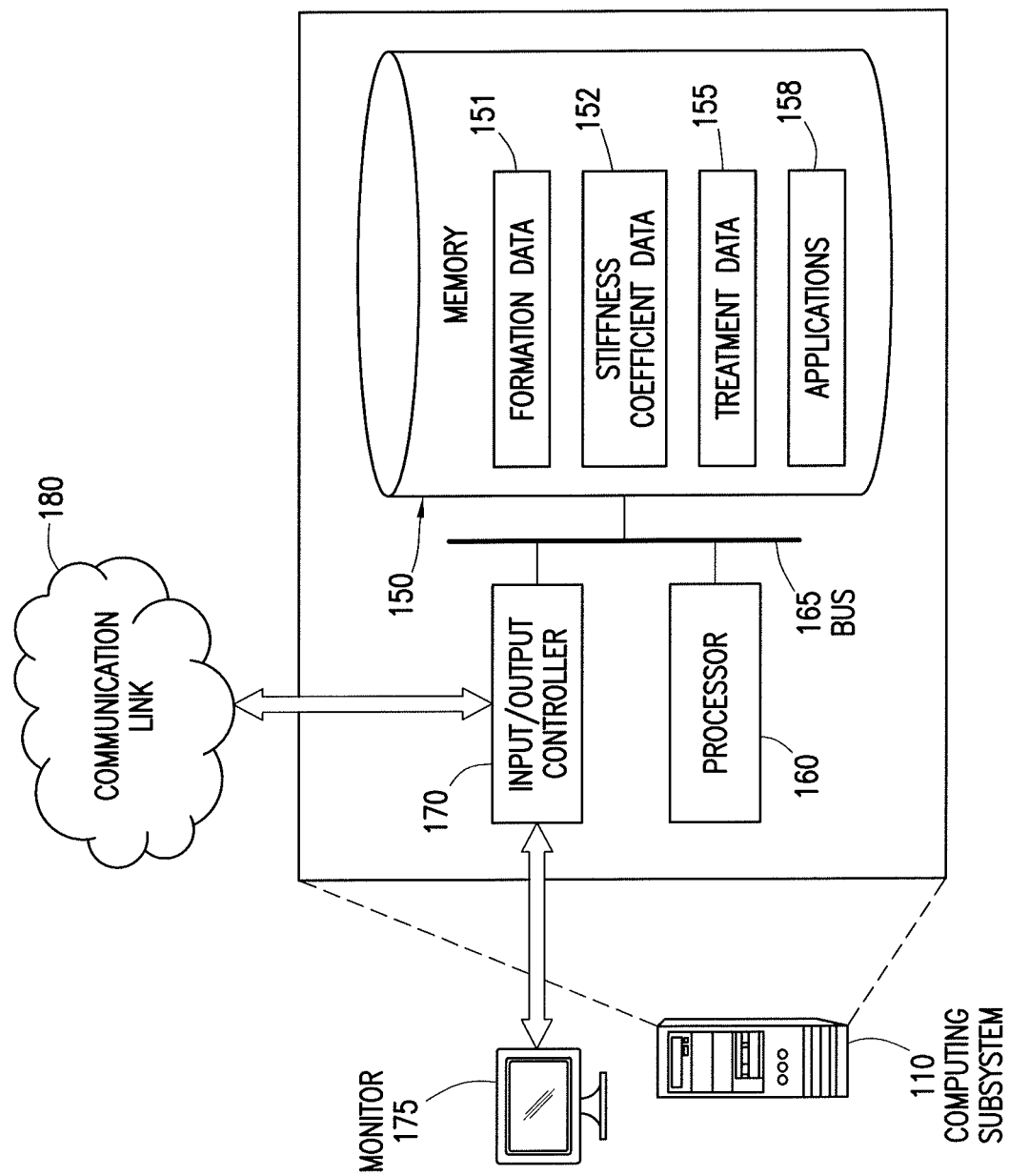
FIG. 2 is a schematic block diagram of a computing subsystem for use in the subterranean operations system of FIG. 1, in accordance with an embodiment of the present disclosure.

FIG. 2 illustrates an embodiment of the computing subsystem 110 of FIG. 1. The computing subsystem 110 may be located at or near one or more wellbores of a well system (e.g., 100 of FIG. 1) or at a remote location. All or part of the computing subsystem 110 may operate as a component of or independent of the well system 100 or independent of any other components shown in FIG. 1. The computing subsystem 110 of FIG. 2 may include a memory 150, a processor 160, and input/output controllers 170 communicatively coupled by a bus 165.

The processor 160 may include hardware for executing instructions, such as those making up a computer program, such as an application 158. As an example and not by way of limitation, to execute instructions, the processor 160 may retrieve (or fetch) the instructions from an internal register, an internal cache, or the memory 150. The processor 160 may then decode and execute the instructions, and then write one or more results to an internal register, an internal cache, or the memory 150. This disclosure contemplates the processor 160 including any suitable number of any suitable internal registers, where appropriate. Where appropriate, the processor 160 may include one or more arithmetic logic units (ALUs), a multi-core processor, or one or more separate processor components. Although this disclosure describes and illustrates a particular processor, this disclosure contemplates any suitable processor.

In some embodiments, the processor 160 may execute instructions, for example, to generate output data based on data inputs. The processor 160 may run the application 158 by executing or interpreting software, scripts, programs, functions, executables, or other modules contained in the application 158. The processor 160 may perform one or more operations related to FIGS. 3-11, such as determining a closure pressure of the formation 104 using a simplified orthorhombic model. The input data received by the processor 160 or output data generated by the processor 160 may include formation data 151 and stiffness coefficient data 152.

The memory 150 may include, for example, random access memory (RAM), a storage device (e.g., a writable read-only memory (ROM) or others), a hard disk, a solid state storage device, or another type of storage medium. The computing subsystem 110 may be preprogrammed or it may be programmed (and reprogrammed) by loading a program from another source (e.g., from a CD-ROM, from another computer device through a data network, or in another manner). In some embodiments, the input/output controller 170 may be coupled to input/output devices (e.g., a monitor 175, a mouse, a keyboard, or other input/output devices) and to a communication link 180. The input/output devices may receive and transmit data in analog or digital form over the communication link 180.

The memory 150 may store instructions (e.g., computer code) associated with an operating system, computer applications, and other resources. The memory 150 may also store application data and data objects that may be interpreted by one or more applications or virtual machines running on the computing subsystem 110. For example, the formation data 151, the stiffness coefficient data 152, and the applications 158 may be stored in the memory 150. In some implementations, a memory of a computing device may include additional or different data, applications, models, or other information.

The formation data 151 may include information that may be used to determine the properties of the formation (e.g., the pore pressure, the Biot coefficient, the vertical stress, and the horizontal stresses). The stiffness coefficient data 152 may include information that may provide a pre-determined set of stiffness coefficients for a formation. The stiffness coefficient data 152 may specify any suitable stiffness coefficient matrix that may be used for calculating the mechanical properties of a formation, such as the minimum and maximum stresses, the Poisson's ratios, and the Young's moduli.

The treatment data 155 may include information on properties of a planned treatment of a subterranean region (e.g., region 104 of FIG. 1). In some embodiments, the treatment data 155 may include information on a pumping schedule for a treatment stage, such as fluid volume, fluid pumping rate, or fluid pumping pressure.

The applications 158 may include software applications, scripts, programs, functions, executables, or other modules that may be interpreted or executed by the processor 160. The applications 158 may include machine-readable instructions for performing one or more operations related to FIGS. 3-11, such as determining a closure pressure of the formation 104 via a simplified model. The applications 158 may include machine-readable instructions for calculating minimum and maximum horizontal stresses, Poisson's ratios, and Young's moduli of a formation and may be used for any suitable subterranean operation. The applications 158 may be configured to calculate mechanical properties of a formation and determine the pressure of the fracturing fluid used during a subterranean operation. The applications 158 may generate output data and store output data in memory 150, in another local medium, or in one or more remote devices (e.g., by sending output data via the communication link 180).

The communication link 180 may include any type of communication channel, connector, data communication network, or other link. For example, the communication link 180 may include a wireless or a wired network, a Local Area Network (LAN), a Wide Area Network (WAN), a private network, a public network (such as the Internet), a WiFi network, a network that includes a satellite link, a serial link, a wireless link (e.g., infrared, radio frequency, or others), a parallel link, or another type of data communication network.

Generally, the techniques described here may be performed at any time, for example, before, during, or after a treatment or other event. In some instances, the techniques described may be implemented in real time, for example, during a stimulation treatment. Additionally, the computing subsystem 110 may be located on the surface of the wellbore or may be located downhole as part of a downhole tool or injection system.

Figure 3:
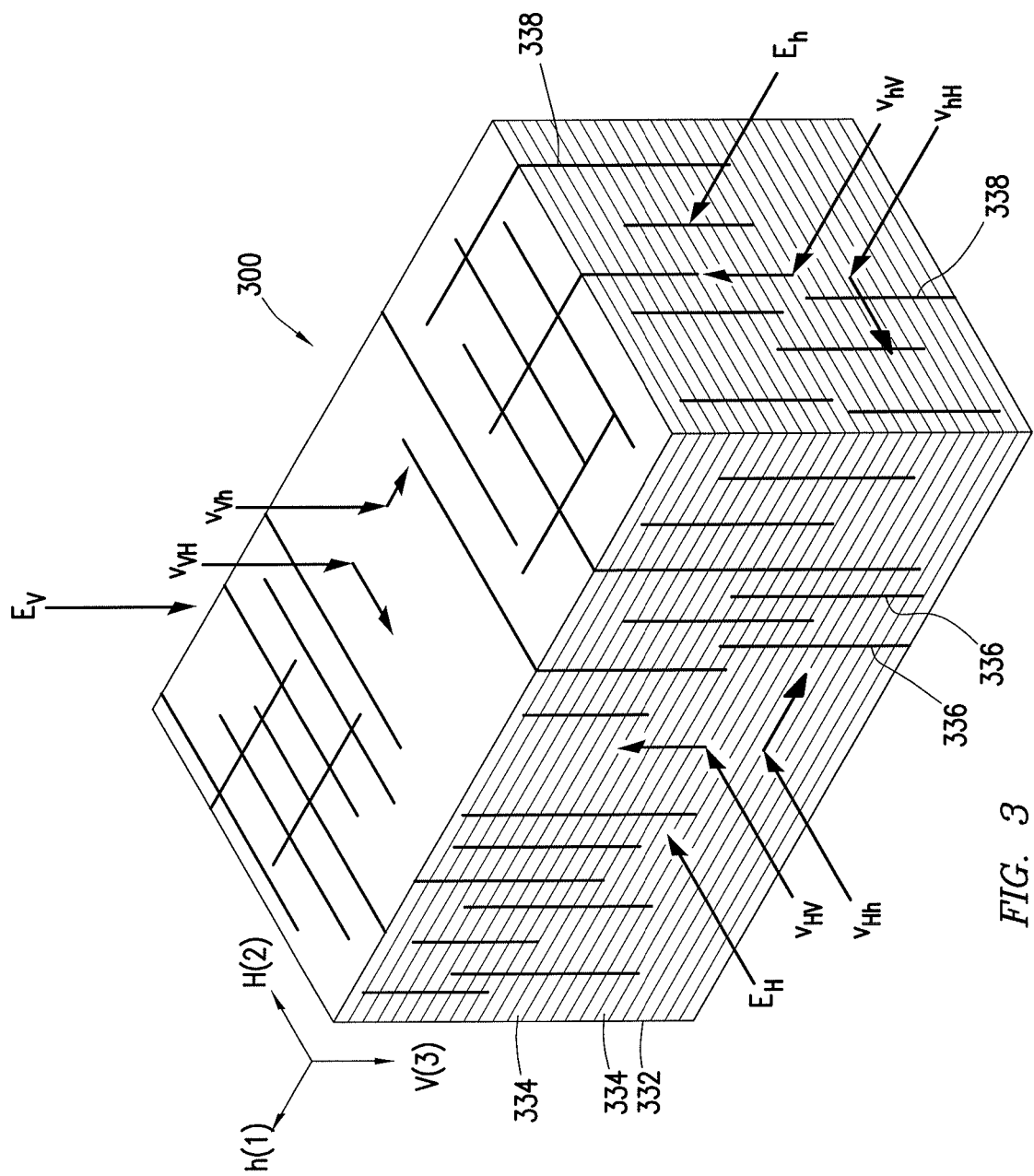
FIG. 3 is an isometric view of a section of a horizontally laminated formation including two sets of vertical fractures, in accordance with an embodiment of the present disclosure.

FIG. 3 illustrates an isometric view of a section of a horizontally laminated formation 332 including two sets of vertical fractures and the associated directional Poisson's ratios and Young's moduli of the formation. The formation 332 may include horizontally laminated layers 334 and two sets of vertical natural fractures 336 and 338. The fractures 336 may be orthogonal to the fractures 338. Where the formation 332 has more than one set of fractures 336 and 338, one set may be said to be the dominant set and may be aligned with the maximum horizontal stress, $\sigma_H$, in the formation 332. In FIG. 3, the fractures 336 are the dominant set of fractures. The coordinate system in FIG. 3 is established to align with the fractures and the H-axis is aligned with the dominant fractures (e.g., fractures 336). The h-axis is aligned with the direction of minimum horizontal stress, $\sigma_h$, which may coincide with the fractures 338. The vertical fractures 336 and 338 may imply that the vertical stress, $\sigma_V$, is the first principal stress. The V-axis is aligned with the vertical direction.

For linear elastic materials such as horizontally laminated formations, stress, $\sigma_{ij}$, in a direction is linearly proportional to strain, $\varepsilon_{ij}$, in the same direction according to Hooke's Law. The proportional relationship between stress and strain may be governed by a fourth-rank stiffness tensor, $C_{ijkl}$, or a fourth-rank compliance tensor, $S_{ijkl}$, as in the following equations:

$$\sigma_{ij} = C_{ijkl} \varepsilon_{kl} \quad (1)$$

$$\varepsilon_{ij} = S_{ijkl} \sigma_{kl} \quad (2)$$

The Poisson's ratios, $v_{ij}$, and Young's moduli, $E_i$, in each direction of the formation 332 may be defined based on the stress and strain in the directions. In FIG. 3, the Poisson's ratios are shown as two arrows, illustrating the direction of applied stress and the direction of strain due to the applied stress. For example, $v_{HV}$ is the Poisson's ratio due to stress applied in the H direction and is defined as the ratio of strain in the V direction to strain in the H direction. The Young's moduli are represented by a single arrow in FIG. 3 and are oriented in the direction of applied stress. The Poisson's ratios and Young's moduli for each direction may be calculated by:

$$v_{VH} = -\frac{\varepsilon_H}{\varepsilon_V} \quad (3)$$

$$v_{Vh} = -\frac{\varepsilon_h}{\varepsilon_V} \quad (4)$$

$$v_{hV} = -\frac{\varepsilon_V}{\varepsilon_h} \quad (5)$$

$$v_{hH} = -\frac{\varepsilon_H}{\varepsilon_h} \quad (6)$$

$$v_{HV} = -\frac{\varepsilon_V}{\varepsilon_H} \quad (7)$$

$$v_{Hh} = -\frac{\varepsilon_h}{\varepsilon_H} \quad (8)$$

$$E_V = \frac{\sigma_V}{\varepsilon_V} \quad (9)$$

$$E_h = \frac{\sigma_h}{\varepsilon_h} \quad (10)$$

$$E_H = \frac{\sigma_H}{\varepsilon_H} \quad (11)$$

The stiffness tensor of a formation may determine the elastic properties of the formation. For horizontally laminated formations with one or two sets of orthogonal vertical fractures, the stiffness tensor may be defined using nine independent parameters using the equation:

$$C = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \quad (12)$$

Assuming there is no summation over repeated indices, equations for the mechanical properties of orthorhombic media may be presented using notations which are easier to understand for geomechanics. The properties that can be determined from the stiffness tensor may be rewritten to reference the axes shown in FIG. 3, according the following equivalencies:

TABLE 1

Conversion between arbitrary notation to geomechanical notation

| 1 ↔ h | 2 ↔ H | 3 ↔ V |
|---|---|---|
| $\varepsilon_{11} \to \varepsilon_h$ | $\varepsilon_{22} \to \varepsilon_H$ | |
| $\sigma_{11} \to \sigma_h$ | $\sigma_{22} \to \sigma_H$ | |
| $E_1 \to E_h$ | $E_2 \to E_H$ | $E_3 \to E_V$ |
| $v_{12} \to v_{hH}$ | $v_{21} \to v_{Hh}$ | $v_{13} \to v_{hV}$ |
| $v_{31} \to v_{Vh}$ | $v_{23} \to v_{HV}$ | $v_{32} \to v_{VH}$ |

In geomechanical applications, the use of the stiffness tensor may be more convenient than the use of the compliance tensor as data about the stiffness tensor parameters may be available from testing and/or modeling of the formation 332. The parameters of the stiffness tensor may be used to create equations for the Poisson's ratios and Young's moduli in each direction. The resulting equations are:

$$v_{12} = v_{hH} = -\frac{C_{13}C_{23} - C_{12}C_{33}}{C_{22}C_{33} - C_{23}^2} \quad (13)$$

$$v_{21} = v_{Hh} = -\frac{C_{13}C_{23} - C_{12}C_{33}}{C_{11}C_{33} - C_{13}^2} \quad (14)$$

$$v_{13} = v_{hV} = -\frac{C_{12}C_{23} - C_{13}C_{22}}{C_{22}C_{33} - C_{23}^2} \quad (15)$$

$$v_{31} = v_{Vh} = -\frac{C_{12}C_{23} - C_{13}C_{22}}{C_{11}C_{22} - C_{12}^2} \quad (16)$$

$$v_{23} = v_{HV} = -\frac{C_{12}C_{13} - C_{11}C_{23}}{C_1C_{33} - C_{13}^2} \quad (17)$$

$$v_{32} = v_{VH} = -\frac{C_{12}C_{13} - C_{11}C_{23}}{C_{11}C_{22} - C_{12}^2} \quad (18)$$

$$E_1 = E_h = -\frac{C_{11}C_{23}^2 + C_{22}C_{13}^2 + C_{33}C_{12}^2 - 2C_{12}C_{13}C_{23} - C_{11}C_{22}C_{33}}{C_{22}C_{33} - C_{23}^2} \quad (19)$$

$$E_2 = E_H = -\frac{C_{11}C_{23}^2 + C_{22}C_{13}^2 + C_{33}C_{12}^2 - 2C_{12}C_{13}C_{23} - C_{11}C_{22}C_{33}}{C_{11}C_{33} - C_{13}^2} \quad (20)$$

$$E_3 = E_V = -\frac{C_{11}C_{23}^2 + C_{22}C_{13}^2 + C_{33}C_{12}^2 - 2C_{12}C_{13}C_{23} - C_{11}C_{22}C_{33}}{C_{11}C_{22} - C_{12}^2} \quad (21)$$

It should be noted that for orthorhombic materials, such as the formation 332 having horizontal laminations and vertical pre-existing fractures, nine independent parameters (components of stiffness matrix, Cij) are used to fully describe the elastic behavior of the medium. However, for computing the exact minimum and maximum horizontal stresses, only six independent parameters (Cij components) have to be determined.

The minimum and maximum horizontal stresses, aligned in the h-direction and H-direction, respectively, may be derived from Hooke's law for orthorhombic media, and may be converted to the notation system convenient for geomechanical applications, shown by Table 1. Hooke's law for orthorhombic media may be expressed as a system of linear equations, and the equation for the maximum horizontal stress on the formation 332 may be calculated as:

$$\sigma_H = \frac{E_H}{E_V}\left(\frac{v_{VH} + v_{Vh}v_{hH}}{1 - v_{Hh}v_{hH}}\right)\sigma_V + \frac{E_H}{1 - v_{Hh}v_{hH}}\varepsilon_H + \frac{E_H v_{hH}}{1 - v_{Hh}v_{hH}}\varepsilon_h \quad (22)$$

This can also be rewritten as:

$$\sigma_H = \frac{v_{HV}}{v_{VH}}\left(\frac{v_{VH} + v_{Vh}v_{hH}}{1 - v_{Hh}v_{hH}}\right)\sigma_V + \frac{E_H}{1 - v_{Hh}v_{hH}}\varepsilon_H + \frac{E_H v_{hH}}{1 - v_{Hh}v_{hH}}\varepsilon_h \quad (23)$$

Similarly, a minimum horizontal stress on the formation 332 may be calculated as:

$$\sigma_h = \frac{E_h}{E_V}\left(\frac{v_{Vh} + v_{VH}v_{Hh}}{1 - v_{Hh}v_{hH}}\right)\sigma_V + \frac{E_h}{1 - v_{Hh}v_{hH}}\varepsilon_h + \frac{E_h v_{Hh}}{1 - v_{Hh}v_{hH}}\varepsilon_H \quad (24)$$

This can also be rewritten as:

$$\sigma_h = \frac{v_{hV}}{v_{Vh}}\left(\frac{v_{Vh} + v_{VH}v_{Hh}}{1 - v_{Hh}v_{hH}}\right)\sigma_V + \frac{E_h}{1 - v_{Hh}v_{hH}}\varepsilon_h + \frac{E_h v_{Hh}}{1 - v_{Hh}v_{hH}}\varepsilon_H \quad (24)$$

These equations may be simplified by assuming that the product of any two Poisson's ratios ν is equal to zero (i.e., $v_{Hh}v_{hH}=0$; $v_{VH}v_{Hv}=0$; and $v_{VH}v_{Hh}=0$). This assumption may be made since, by definition, Poisson's ratio is a number smaller than one and, therefore, the product of two Poisson's ratios will likely be a very small number close to zero. Making this assumption, Equations 23 and 25 may be simplified to the following:

$$\sigma_H = v_{HV}\sigma_V E_H(\varepsilon_H + v_{hH}\varepsilon_h) \quad (26)$$

$$\sigma_h = v_{hV}\sigma_V E_h(\varepsilon_h + v_{Hh}\varepsilon_H) \quad (27)$$

Equations 26 and 27 are referred to herein as the "simplified" orthorhombic model for computing anisotropic stresses in the formation 332. The above assumption ($v_{Hh}v_{hH}=0$; $v_{Vh}v_{hV}=0$; and $v_{VH}v_{Hh}=0$) may be more acceptable in accurately describing the mechanical stresses in the formation 332 as $v_{Hh}$ and $v_{hH}$ become smaller. As described below, these Poisson's ratio values do become smaller as the formation's fracture density increases. Thus, the simplified model may be more accurate when used to calculate stresses in formation regions with higher fracture densities. As noted above, it is often desirable to select locations along the wellbore for fracturing that already have a high pre-existing fracture density. Accordingly, the simplified geomechanical model described herein may be particularly suitable for calculating mechanical stresses on the formation 332 where a fracturing operation is to be performed.

In geomechanics, the effect of the pore pressure in the formation 332 may also be considered when creating a simplified model. The pore pressure is the pressure of fluids located within the pores of the formation 332. Considering the effects of the pore pressure in the formation 332, Equations 26 and 27 become:

$$\sigma_H = v_{HV}(\sigma_V - \alpha P) + E_H(\varepsilon_H + v_{hH}\varepsilon_h) + \alpha P \quad (28)$$

$$\sigma_h = v_{hV}(\sigma_V - \alpha P) + E_h(\varepsilon_h + v_{Hh}\varepsilon_H) + \alpha P \quad (29)$$

In Equations 28 and 29, P is the pore pressure and α is the Biot coefficient. The Biot coefficient is a function of the properties of the formation 332. While in Equations 28 and 29 the Biot coefficient is assumed to be isotropic and a constant number, the Biot coefficient may also be anisotropic and represented as a matrix and may vary during the subterranean operation. Equations 26 and 27 may be used to determine the fracture closure pressure of the formation 332. The fracture closure pressure may then be used to select the pressure of the fracturing fluid such that the pressure of the fracturing fluid is higher than the fracture closure pressure.

The simplified geomechanical model disclosed herein may be a relatively accurate model and may be easily implemented to evaluate anisotropic pre-fractured formations to design a fracturing operation (e.g., by determining an appropriate pumping pressure for the fracturing operation). As described in detail below, the simplified geomechanical model represented by Equations 26 and 27 (or 28 and 29) may provide a more accurate representation of the stresses in the formation 332, as compared to an isotropic model or a vertically transverse isotropic (VTI) model. In addition, the simplified geomechanical model presented herein may be relatively simple to construct, compared to the full orthorhombic mechanical model. To create the full orthorhombic model, for instance, measurements of several different mechanical properties must be made to determine 9 parameters that make up the orthorhombic model of Equations 22-25. With the simplified orthorhombic model of Equations 26 and 27, however, only 6 parameters (and in some cases 3 parameters) are needed to construct the model. Thus, fewer mechanical measurements (e.g., taken via sensors) are needed to generate the simplified model. Although models under the isotropic assumption or the VTI assumption may require even fewer parameters (e.g., 2 and 5, respectively) to be determined via sensor measurements, these models may not provide the desired accuracy in calculating anisotropic stresses in the formation 332.

Again, the simplified orthorhombic model of Equations 26 and 27 may be generated based on 6 detected parameters. These parameters may include $v_{HV}$, $E_H$, $v_{hH}$, $v_{hV}$, $E_h$, and $v_{Hh}$. These parameters may be determined by taking a number of sensor measurements. For example, ultrasonic sensors may be used downhole to perform 6 measurements of compression wave velocities and/or shear wave velocities along the formation to arrive at the 6 parameters defining the simplified model. In other embodiments, just 3 measurements may be taken via stress/strain testing of a formation sample brought to the surface. These 3 measurements may be enough to derive the 6 parameters (Young's moduli/Poisson's ratios) needed to generate the simplified model. Accordingly, the simplified geomechanical model may be relatively easy to construct while still remaining an accurate model of anisotropic stresses in the formation 332.

An accurate estimation of the stresses in formation 332 may be important when designing a subterranean operation (e.g., fracturing operation). The geomechanical behavior of orthorhombic media may be investigated and the accuracy of the simplified model may be evaluated based on two sets of theoretical data. That is, the following two theoretical models may be used to compute the $C_{ij}$ components for orthorhombic media. The two theories may be used to model an anisotropic, laminated formation (e.g., VTI background) with two sets of vertical fractures having different fracture densities, as shown in FIG. 3. The overall fracture densities in these theoretical models may be adjusted in a way that gives a shear wave splitting (SWS) in a range of approximately 1% to 15%. SWS is related to the overall fracture density of the formation, such that a higher SWS corresponds to a higher fracture density.

The two theoretical models may be derived based on different definitions of SWS. For example, in the first theoretical model, SWS may be defined as the difference between the fast and slow shear wave velocities (measured in a vertical well) divided by the fast shear wave velocity. In other words, the SWS may be defined as the relative speed at which the fast shear wave separates from the slow shear wave (taken as a percent with respect to the fast shear velocity). This calculation of SWS is represented as:

$$SWS = \frac{v_s^{fast} - v_s^{slow}}{v_s^{fast}} \times 100 \quad (30)$$

In Equation 30, $v_s^{fast}$ and $v_s^{slow}$ are the fast and slow shear wave velocities, respectively, as measured for instance by a dipole sonic tool in a vertical well. Results of $C_{ij}$ modeling for this first theoretical set of SWS values are shown in Table 2 below. In Table 2, each row shows $C_{ij}$ values (in GPa) for orthorhombic media with different fracture density (i.e., different SWS) values defined by Equation 30. In the second theoretical model, SWS may be defined with relation to the stiffness tensor parameters as:

$$SWS = \frac{C_{44} - C_{55}}{C_{44} + C_{44}} \times 100 \quad (31)$$

Results of $C_{ij}$ modeling for this second theoretical set of SWS values are shown in Table 3 below. In Table 3, each row shows $C_{ij}$ values (in GPa) for orthorhombic media with different fracture density (i.e., different SWS) values defined by Equation 31.

TABLE 2

Computed $C_{ij}$ values determined using first theoretical model

| SWS | C11 | C22 | C33 | C44 | C55 | C66 | C12 | C13 | C23 |
|---|---|---|---|---|---|---|---|---|---|
| 1.13 | 36.96 | 39.52 | 30.79 | 12.25 | 11.97 | 13.56 | 9.89 | 5.89 | 6.21 |
| 2.20 | 33.78 | 38.35 | 30.69 | 12.15 | 11.62 | 12.50 | 8.84 | 5.36 | 5.93 |
| 3.23 | 31.11 | 37.28 | 30.60 | 12.06 | 11.30 | 11.59 | 7.96 | 4.91 | 5.69 |
| 4.21 | 28.83 | 36.29 | 30.52 | 11.97 | 10.99 | 10.81 | 7.22 | 4.53 | 5.47 |
| 5.14 | 26.87 | 35.37 | 30.46 | 11.88 | 10.69 | 10.12 | 6.59 | 4.20 | 5.27 |
| 6.04 | 25.15 | 34.51 | 30.40 | 11.80 | 10.41 | 9.52 | 6.04 | 3.92 | 5.09 |
| 6.90 | 23.65 | 33.70 | 30.35 | 11.71 | 10.15 | 8.99 | 5.56 | 3.67 | 4.93 |
| 7.72 | 22.31 | 32.93 | 30.30 | 11.62 | 9.90 | 8.51 | 5.14 | 3.45 | 4.78 |
| 8.51 | 21.12 | 32.21 | 30.26 | 11.54 | 9.66 | 8.08 | 4.77 | 3.25 | 4.65 |
| 9.27 | 20.04 | 31.52 | 30.22 | 11.46 | 9.43 | 7.69 | 4.44 | 3.08 | 4.52 |
| 10.00 | 19.08 | 30.87 | 30.19 | 11.38 | 9.21 | 7.34 | 4.15 | 2.92 | 4.40 |
| 10.71 | 18.20 | 30.24 | 30.16 | 11.30 | 9.01 | 7.02 | 3.89 | 2.78 | 4.29 |
| 11.38 | 17.40 | 29.65 | 30.13 | 11.22 | 8.81 | 6.72 | 3.65 | 2.64 | 4.18 |
| 12.04 | 16.67 | 29.08 | 30.10 | 11.14 | 8.62 | 6.45 | 3.43 | 2.53 | 4.09 |
| 12.67 | 15.99 | 28.53 | 30.07 | 11.06 | 8.44 | 6.20 | 3.24 | 2.42 | 3.99 |
| 13.28 | 15.37 | 28.01 | 30.05 | 10.99 | 8.26 | 5.97 | 3.06 | 2.32 | 3.90 |
| 13.86 | 14.80 | 27.50 | 30.03 | 10.91 | 8.10 | 5.75 | 2.89 | 2.22 | 3.82 |
| 14.43 | 14.26 | 27.02 | 30.01 | 10.84 | 7.93 | 5.55 | 2.74 | 2.14 | 3.74 |
| 14.98 | 13.77 | 26.55 | 29.99 | 10.76 | 7.78 | 5.37 | 2.61 | 2.06 | 3.66 |
| 15.51 | 13.31 | 26.10 | 29.97 | 10.69 | 7.63 | 5.19 | 2.48 | 1.98 | 3.59 |

TABLE 3

Computed $C_{ij}$ values determined using second theoretical model

| SWS | C11 | C22 | C33 | C44 | C55 | C66 | C12 | C13 | C23 |
|---|---|---|---|---|---|---|---|---|---|
| 0.64 | 40.65 | 40.76 | 40.77 | 12.11 | 11.96 | 12.11 | 16.05 | 16.06 | 16.09 |
| 1.28 | 40.26 | 40.65 | 40.71 | 12.07 | 11.76 | 11.88 | 15.88 | 15.90 | 16.01 |
| 1.94 | 39.67 | 40.48 | 40.60 | 12.03 | 11.57 | 11.65 | 15.62 | 15.65 | 15.88 |
| 2.60 | 38.91 | 40.26 | 40.47 | 12.00 | 11.38 | 11.42 | 15.29 | 15.35 | 15.73 |
| 3.27 | 38.03 | 40.01 | 40.32 | 11.96 | 11.19 | 11.19 | 14.90 | 14.99 | 15.55 |
| 3.95 | 37.03 | 39.71 | 40.14 | 11.92 | 11.00 | 10.96 | 14.46 | 14.58 | 15.34 |
| 4.64 | 35.95 | 39.39 | 39.95 | 11.88 | 10.80 | 10.73 | 13.97 | 14.13 | 15.11 |
| 5.34 | 34.78 | 39.04 | 39.75 | 11.84 | 10.61 | 10.50 | 13.46 | 13.66 | 14.86 |
| 6.05 | 33.55 | 38.66 | 39.53 | 11.80 | 10.42 | 10.26 | 12.91 | 13.15 | 14.60 |
| 6.77 | 32.26 | 38.27 | 39.30 | 11.76 | 10.23 | 10.03 | 12.33 | 12.63 | 14.33 |
| 7.50 | 30.92 | 37.86 | 39.07 | 11.73 | 10.03 | 9.80 | 11.73 | 12.08 | 14.04 |
| 8.24 | 29.54 | 37.43 | 38.82 | 11.69 | 9.84 | 9.57 | 11.12 | 11.51 | 13.74 |
| 8.99 | 28.12 | 36.98 | 38.57 | 11.65 | 9.65 | 9.34 | 10.48 | 10.93 | 13.44 |
| 9.75 | 26.66 | 36.53 | 38.31 | 11.61 | 9.46 | 9.11 | 9.82 | 10.33 | 13.12 |
| 10.53 | 25.18 | 36.06 | 38.05 | 11.57 | 9.26 | 8.88 | 9.16 | 9.72 | 12.80 |
| 11.32 | 23.66 | 35.58 | 37.78 | 11.53 | 9.07 | 8.65 | 8.48 | 9.10 | 12.47 |
| 12.11 | 22.13 | 35.09 | 37.51 | 11.50 | 8.88 | 8.42 | 7.78 | 8.47 | 12.14 |
| 12.93 | 20.57 | 34.59 | 37.23 | 11.46 | 8.69 | 8.19 | 7.08 | 7.83 | 11.80 |
| 13.75 | 18.99 | 34.08 | 36.95 | 11.42 | 8.49 | 7.96 | 6.37 | 7.18 | 11.45 |
| 14.59 | 17.40 | 33.57 | 36.66 | 11.38 | 8.30 | 7.72 | 5.65 | 6.53 | 11.10 |

The numerical modeling provided in Table 2 and Table 3 shows that for the two datasets analyzed, the SWS values obtained by Equations 30 and 31 are relatively close. It should be noted that the SWS here is assumed to be caused only by pre-existing fractures in the formation 332. However, dipole sonic logs used to determine SWS may, in some cases, be affected by other factors such as stress anisotropy in addition to fractures. It should be noted that the two theories being analyzed are fundamentally different and have different definitions of "fracture density". Therefore, to make the analysis suitable for well log observations, SWS may be considered instead of fracture density. As noted above, SWS may be measured by logging tools such as a dipole sonic tool (ignoring the effect of stresses on dipole sonic measurements).

Figure 4B:
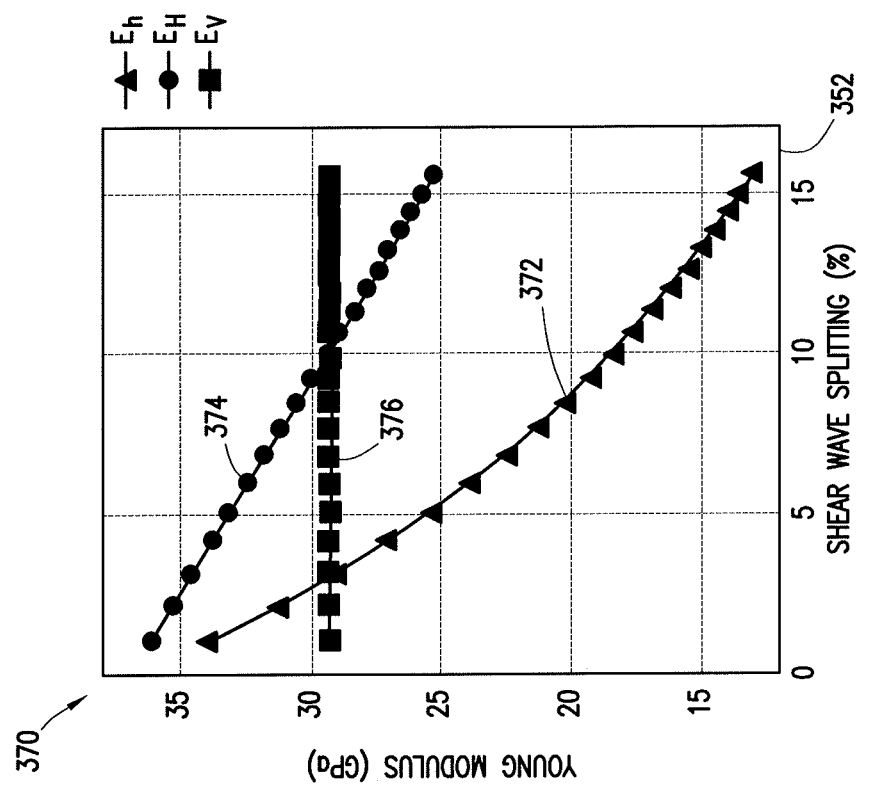
FIGS. 4A and 4B are graphs illustrating Poisson's ratio and Young's modulus values computed for different shear wave splitting values, in accordance with an embodiment of the present disclosure.
Figure 4A:
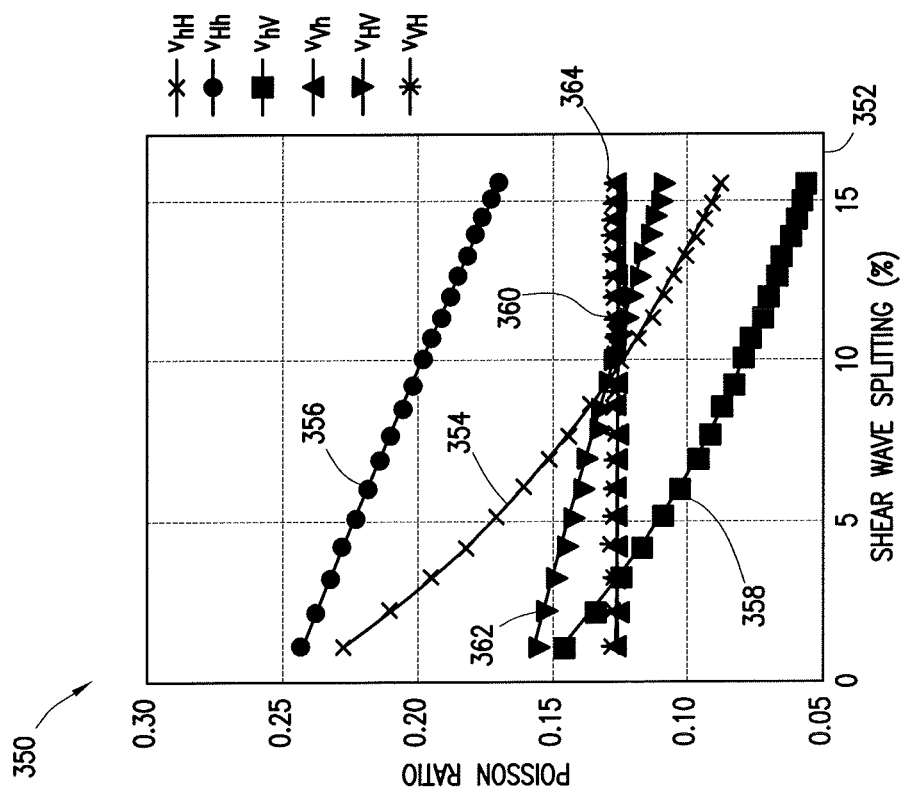

FIGS. 4A and 4B illustrate the directional-dependent mechanical properties (e.g., Poisson's ratios and Young's moduli) of a formation computed using the $C_{ij}$ values in Table 2, as determined based on the first theoretical model. Specifically, FIG. 4A is a graph 350 illustrating different Poisson's ratios of the orthorhombic media determined based on the $C_{ij}$ values of Table 2 plotted with respect to the corresponding SWS 352. Curves 354, 356, 358, 360, 362, and 364 may correspond respectively to $\nu_{hH}$, $\nu_{Hh}$, $\nu_{hV}$, $\nu_{Vh}$, $\nu_{HV}$, and $\nu_{VH}$. FIG. 4B is a graph 370 illustrating different Young's moduli of the orthorhombic media determined based on the $C_{ij}$ values of Table 2 plotted with respect to a corresponding SWS 352. Curves 372, 374, and 376 may correspond respectively to $E_h$, $E_H$, and $E_V$. In general, the Poisson's ratios and Young's moduli illustrated in FIGS. 4A and 4B decrease with increasing SWS 352. However, $\nu_{VH}$ (curve 364), $\nu_{Vh}$ (curve 360), and $E_V$ (curve 376) generally remain almost unchanged with the increasing SWS 352. The assumption ($\nu_{Hh}\nu_{hH}=0$) made in the simplified geomechanical model as described above with relation to Equations 26 and 27 is considered to be physically plausible, since FIG. 4A indicates both of these Poisson's ratios (354 and 356) decreasing significantly with the increasing SWS 352.

Figure 5B:
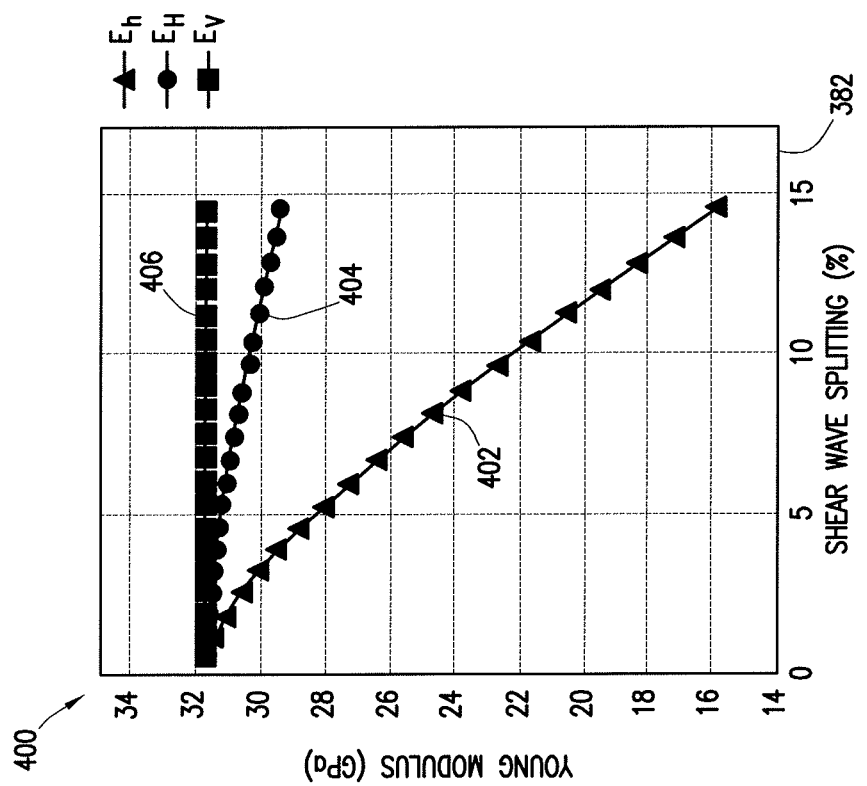
FIGS. 5A and 5B are graphs illustrating Poisson's ratio and Young's modulus values computed for different shear wave splitting values, in accordance with an embodiment of the present disclosure.
Figure 5A:
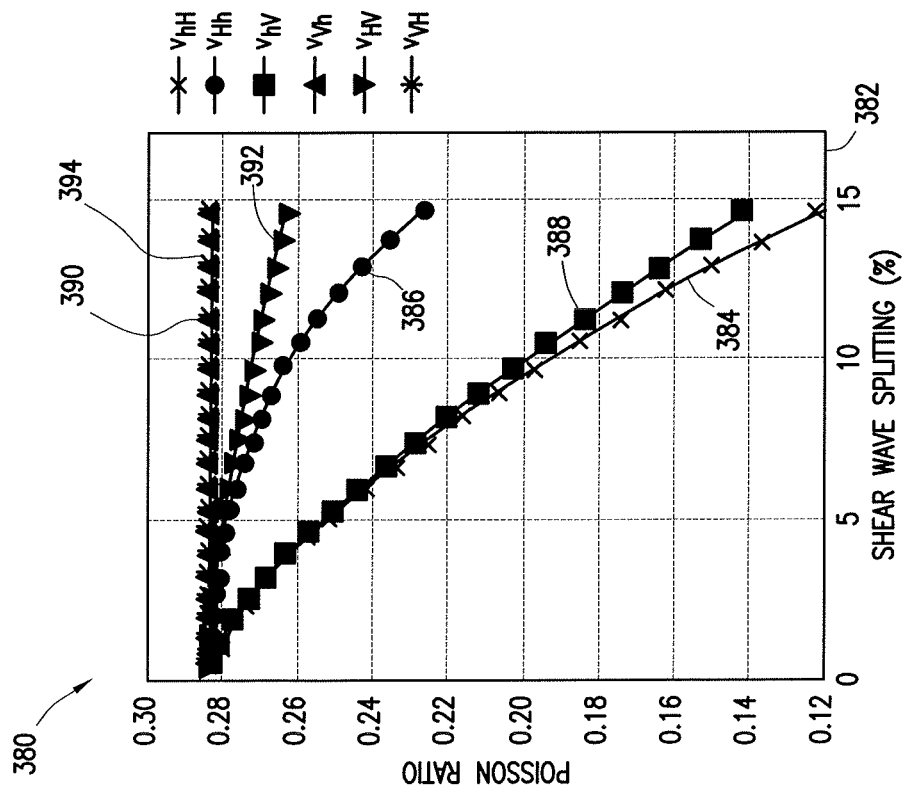

FIGS. 5A and 5B illustrate the directional-dependent mechanical properties (e.g., Poisson's ratios and Young's moduli) of a formation computed using the $C_{ij}$ values in Table 3, as determined based on the second theoretical model. Specifically, FIG. 5A is a graph 380 illustrating different Poisson's ratios of the orthorhombic media determined based on the $C_{ij}$ values of Table 3 plotted with respect to a corresponding SWS 382. Curves 384, 386, 388, 390, 392, and 394 may correspond respectively to $\nu_{hH}$, $\nu_{Hh}$, $\nu_{hV}$, $\nu_{Vh}$, $\nu_{HV}$, and $\nu_{VH}$. FIG. 5B is a graph 400 illustrating different Young's moduli of the orthorhombic media determined based on the $C_{ij}$ values of Table 3 plotted with respect to the corresponding SWS 382. Curves 402, 404, and 406 may correspond respectively to $E_h$, $E_H$, and $E_V$. In general, the Poisson's ratios and Young's moduli illustrated in FIGS. 5A and 5B decrease with increasing SWS 382. However, $\nu_{VH}$ (curve 394), $\nu_{Vh}$ (curve 390), and $E_V$ (curve 406) generally remain almost unchanged with the increasing SWS 382. The assumption ($\nu_{Hh}\nu_{hH}=0$) made in the simplified geomechanical model as described above with relation to Equations 26 and 27 is considered to be physically plausible, since FIG. 5A indicates both of these Poisson's ratios (384 and 386) decreasing significantly with the increasing SWS 382.

Figure 6:
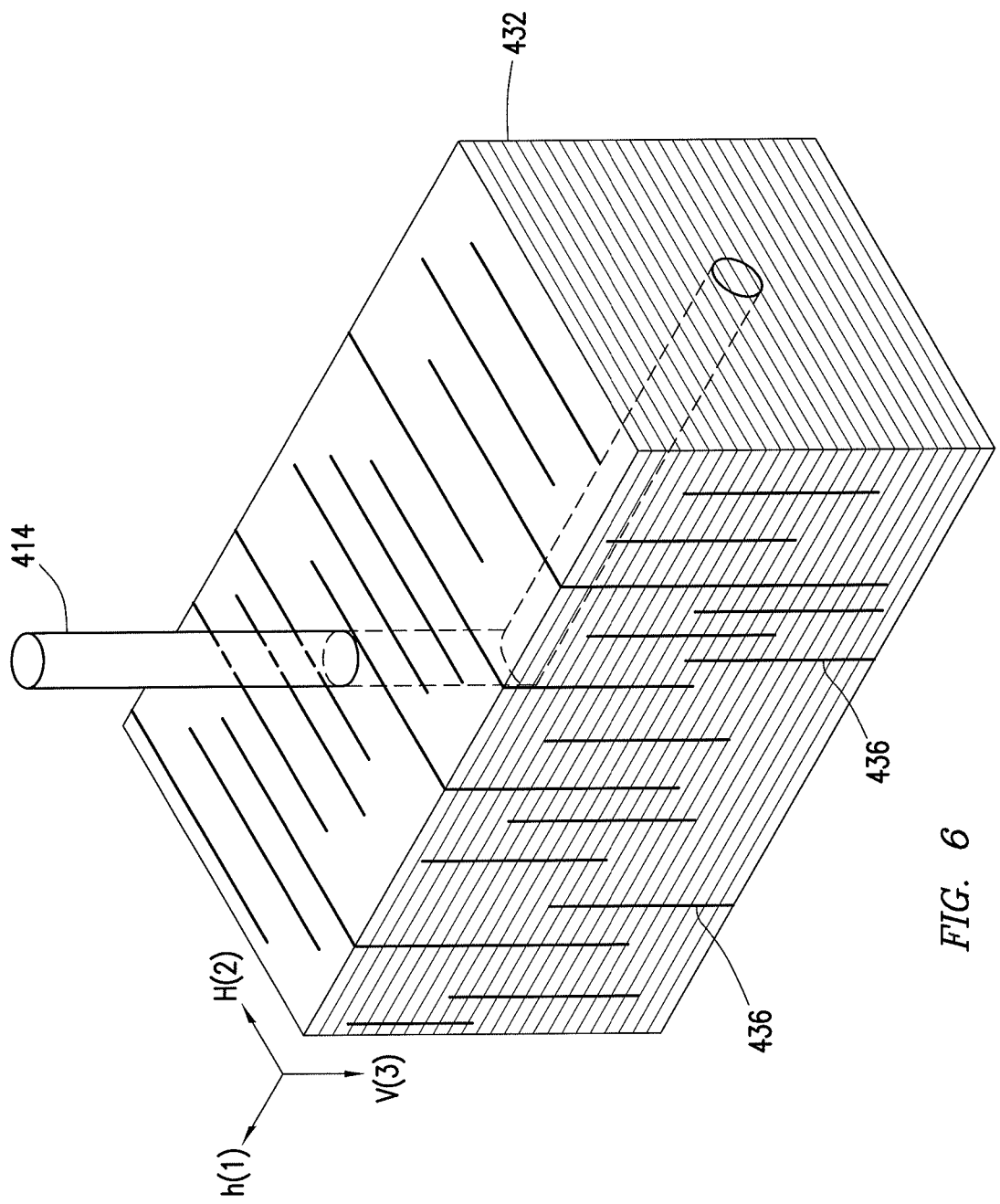
FIG. 6 is an isometric view of a subterranean operation with a horizontal well drilled perpendicular to the dominant fractures in a formation, in accordance with an embodiment of the present disclosure.

To evaluate the accuracy of the disclosed simplified model, different well arrangements may be considered. To that end, FIG. 6 illustrates an isometric view of a subterranean operation with a horizontal well drilled perpendicular to the dominant fractures in a formation 432. A wellbore 414 may be drilled vertically to a predetermined depth and then drilled horizontally through the formation 432 in a direction perpendicular to dominant fractures 436. The coordinate system shown in FIG. 6 is oriented such that the H-direction corresponds to the direction of dominant fractures 436. Because the wellbore 414 is drilled perpendicular to the dominant fractures 436, it may also be parallel to the direction of the minimum horizontal stress, $\nu_h$. FIG. 6 may represent a desired direction for the wellbore 414 as fractures may be easier to open when the wellbore 414 is perpendicular to the dominant fractures 436.

The stresses calculated by the disclosed simplified geomechanical model where both the fractures 436 and the anisotropic nature of the formation 432 are considered may be compared with a model that only considers the anisotropic nature of the formation 432 ("vertically transverse isotropic (VTI) model"), a model that assumes that the formation 432 is isotropic ("isotropic model"), and a model that assumes a full orthorhombic behavior of the formation 432 ("orthorhombic model"). Such comparisons are shown in FIGS. 7A-7F and 8A-8F using the two datasets (e.g., Tables 2 and 3) obtained via the theoretical models described in Equations 30 and 31. The use of these two datasets provides a comparison of the simplified geomechanical model for two different orthorhombic media.

FIGS. 7A-7F illustrate mechanical properties calculated from data obtained using the first theoretical model of Table 2 (Equation 30). For these calculations, it may be assumed that the horizontal well is drilled perpendicular to the dominant fractures, as shown in FIG. 6. FIGS. 7A-7F generally illustrate anisotropic stresses (and error calculations) computed with respect to SWS 450 using $C_{ij}$ components obtained from the first theoretical model of Table 2. FIGS. 7A-7F may show stresses calculated for orthorhombic media using both the full orthorhombic model (curve 452) and the simplified orthorhombic model (curve 454). To further investigate the amount of error introduced into the calculations, the figures may also show stresses calculated using the VTI model (curve 456) and the isotropic model (curve 458). To calculate the stresses using the VTI model for the horizontal well of FIG. 6, $C_{22}$ is assumed to be equal to $C_{11}$ and $C_{23}$ is assumed to be equal to $C_{13}$. For the isotropic model, $C_{22}$ is assumed to be equal to $C_{11}$, $C_{23}$ is assumed to be equal to $C_{13}$, $C_{12}$ is assumed to be equal to $C_{13}$, and $C_{33}$ is assumed to be equal to $C_{11}$. For all three models, the properties of formation 432 are assumed to be:

$$\sigma_V=7250 \text{ psi;}$$

$$P=3600 \text{ psi;}$$

$$\varepsilon_h=0.2 \text{ mm;}$$

$$\varepsilon_H=0.4 \text{ mm; and}$$

$$\alpha=0.7.$$

Figure 7A:
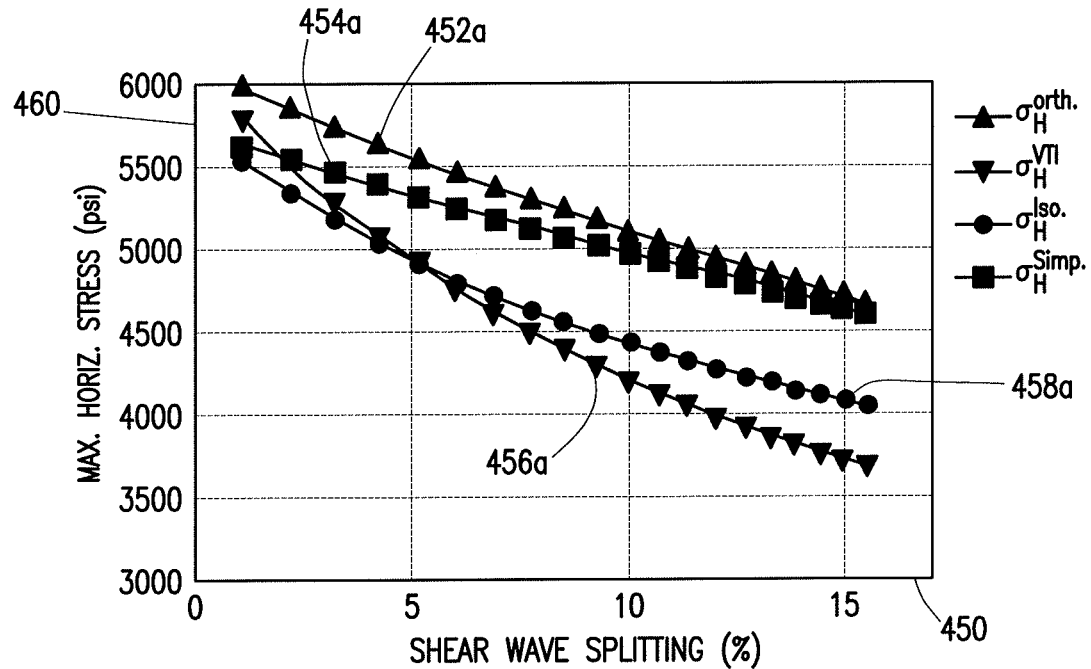
FIGS. 7A-7F are graphs illustrating anisotropic stresses on the formation of FIG. 6 and errors of these anisotropic stresses, in accordance with an embodiment of the present disclosure.
Figure 7B:
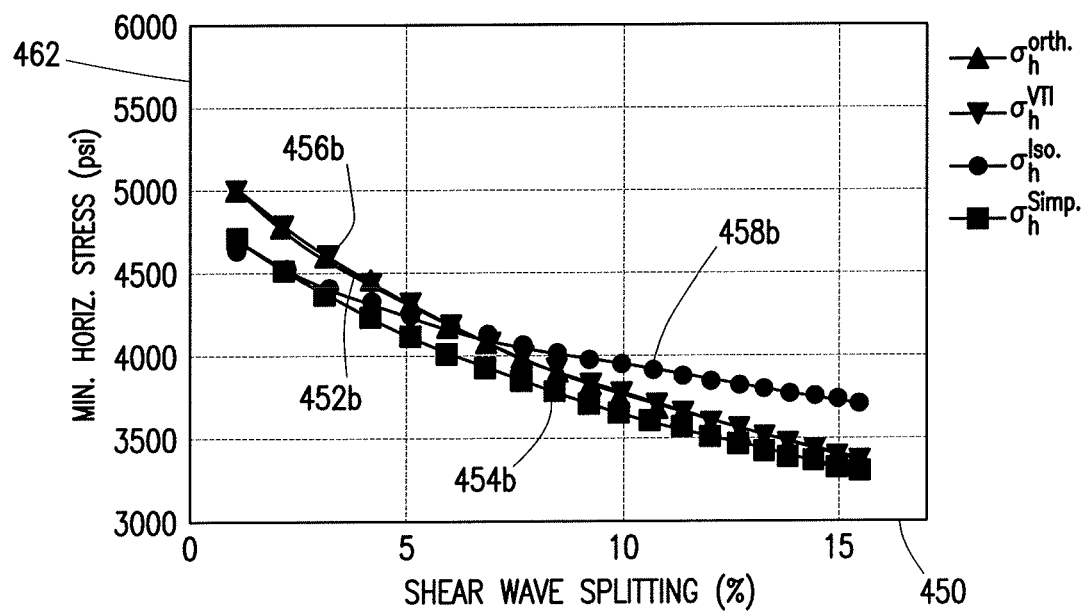
Figure 7C:
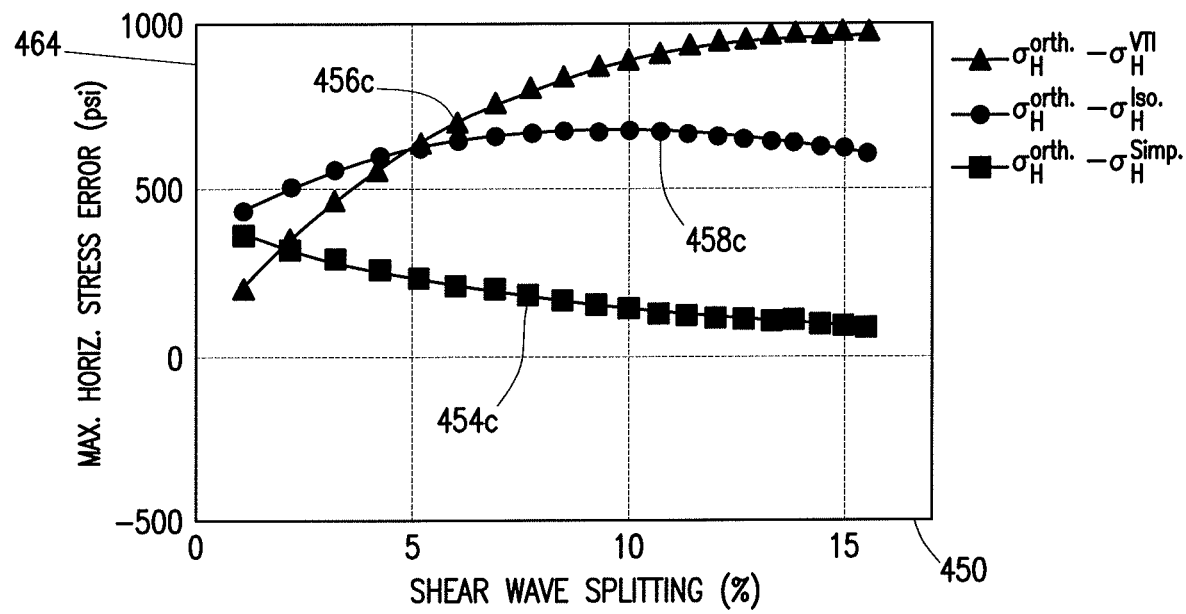
Figure 7D:
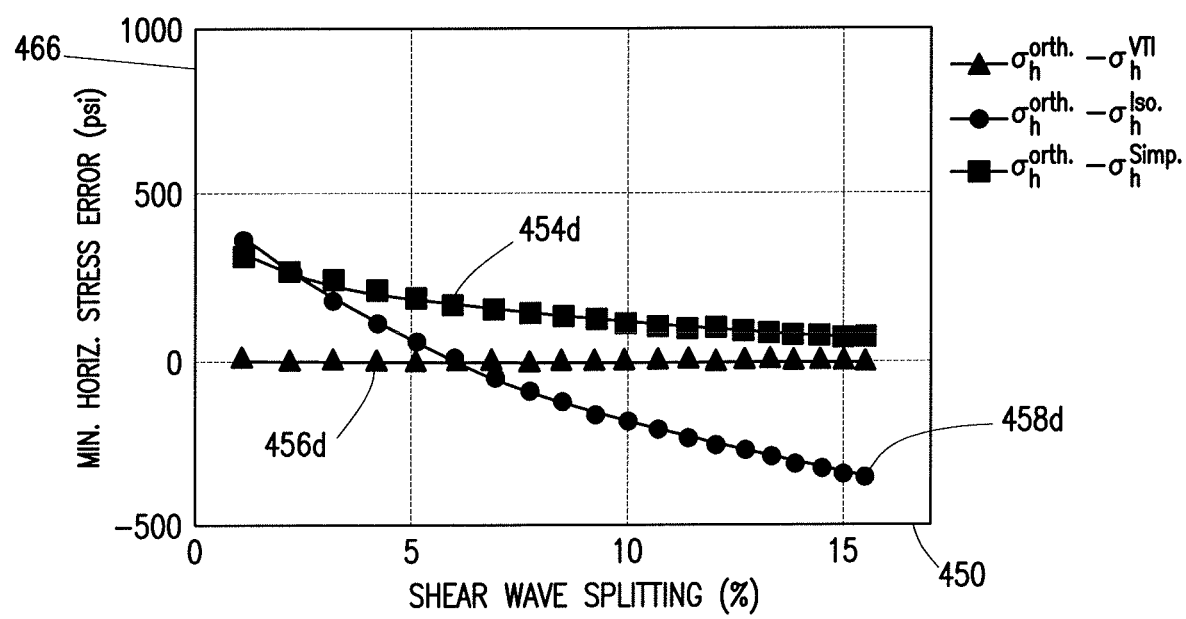
Figure 7E:
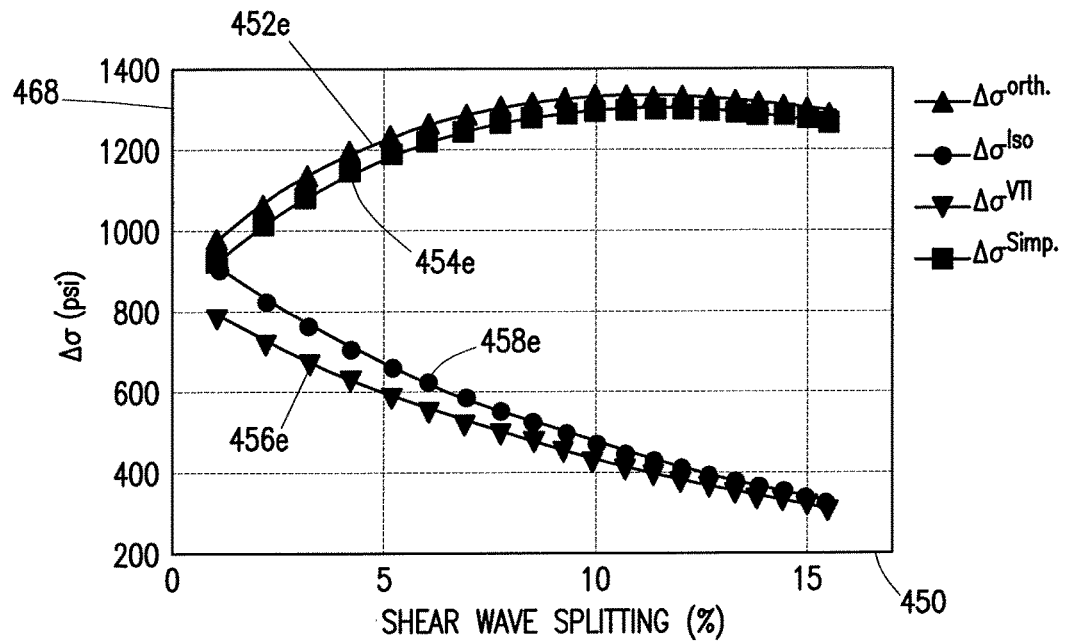
Figure 7F:
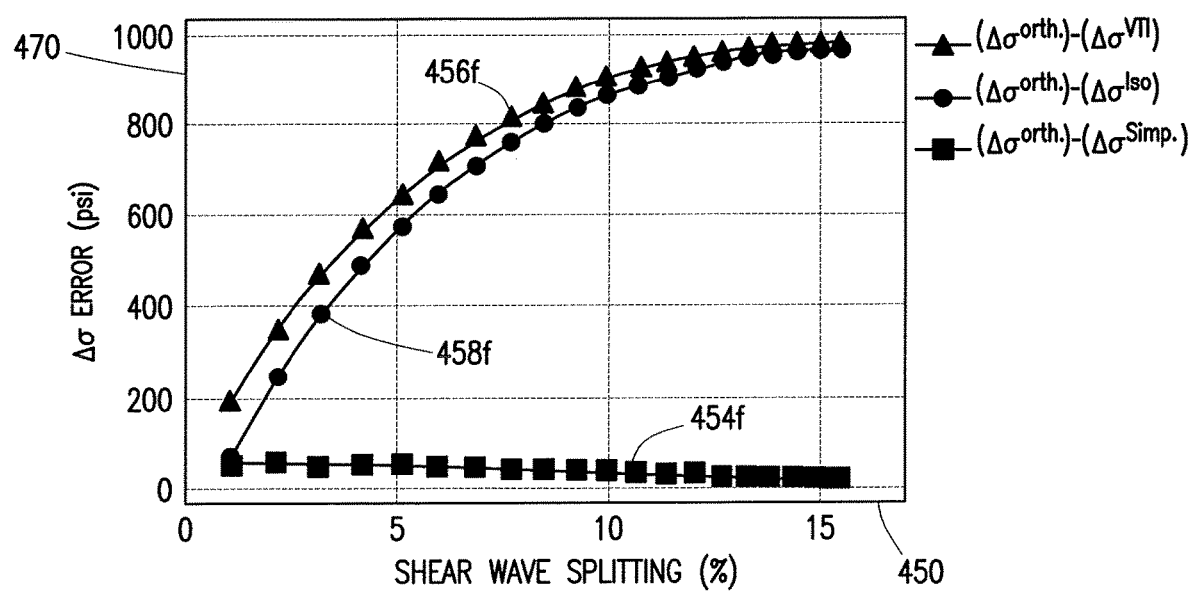

FIG. 7A illustrates a maximum horizontal stress 460 for the exact orthorhombic (452a), simplified orthorhombic (454a), VTI (456a), and isotropic (458a) models taken with respect to the SWS 450. FIG. 7B illustrates a minimum horizontal stress 462 for the exact orthorhombic (452b), simplified orthorhombic (454b), VTI (456b), and isotropic (458b) models taken with respect to the SWS 450. FIG. 7C illustrates errors 464 in computing the maximum horizontal stress 460, and FIG. 7D illustrates errors 466 in computing the minimum horizontal stress 462. FIG. 7E illustrates a stress anisotropic magnitude ($\sigma_H$-$\sigma_h$, or $\Delta\sigma$) 468 using the different models, and FIG. 7F illustrates errors 470 in computing the stress anisotropic magnitude 468.

FIGS. 8A-8F illustrate mechanical properties calculated from data obtained using the second theoretical model of Table 3 (Equation 31). For these calculations, it may be assumed that the horizontal well is drilled perpendicular to the dominant fractures, as shown in FIG. 6. FIGS. 8A-8F generally illustrate anisotropic stresses (and error calculations) computed with respect to SWS 480 using $C_{ij}$ components obtained from the second theoretical model of Table 3. FIGS. 8A-8F may show stresses calculated for orthorhombic media using the full orthorhombic model (curve 482), the simplified orthorhombic model (curve 484), the VTI model (curve 486), and the isotropic model (curve 488).

Figure 8A:
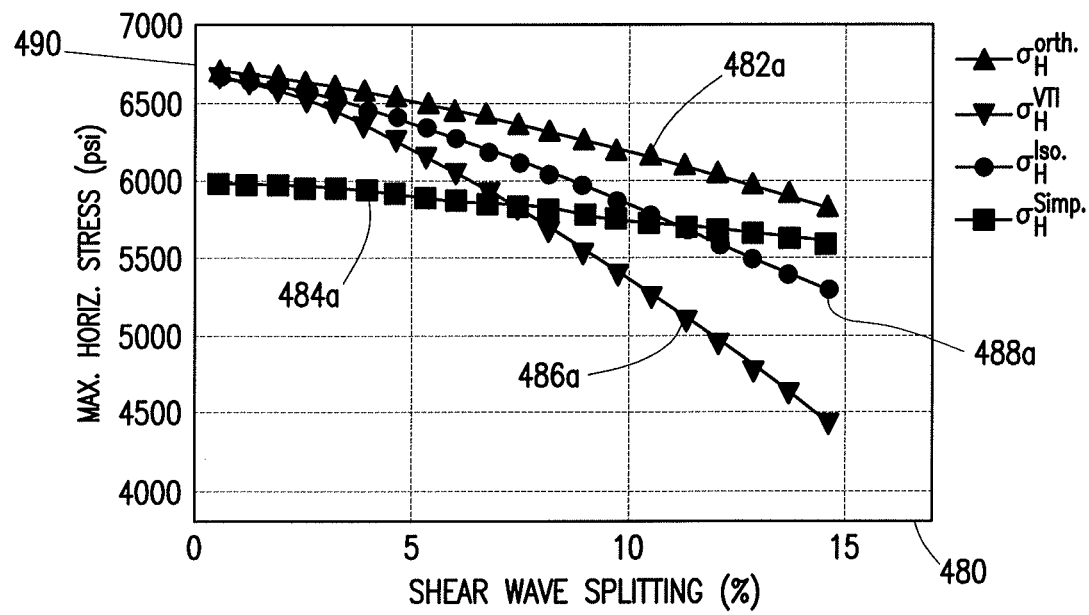
FIGS. 8A-8F are graphs illustrating anisotropic stresses on the formation of FIG. 6 and errors of these anisotropic stresses, in accordance with an embodiment of the present disclosure.
Figure 8B:
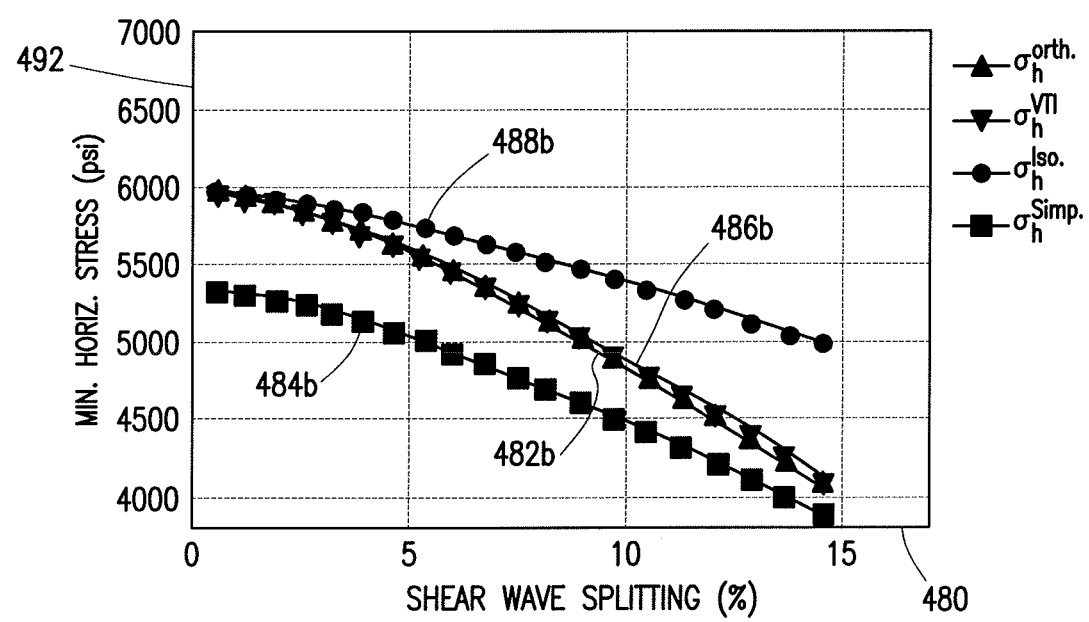
Figure 8C:
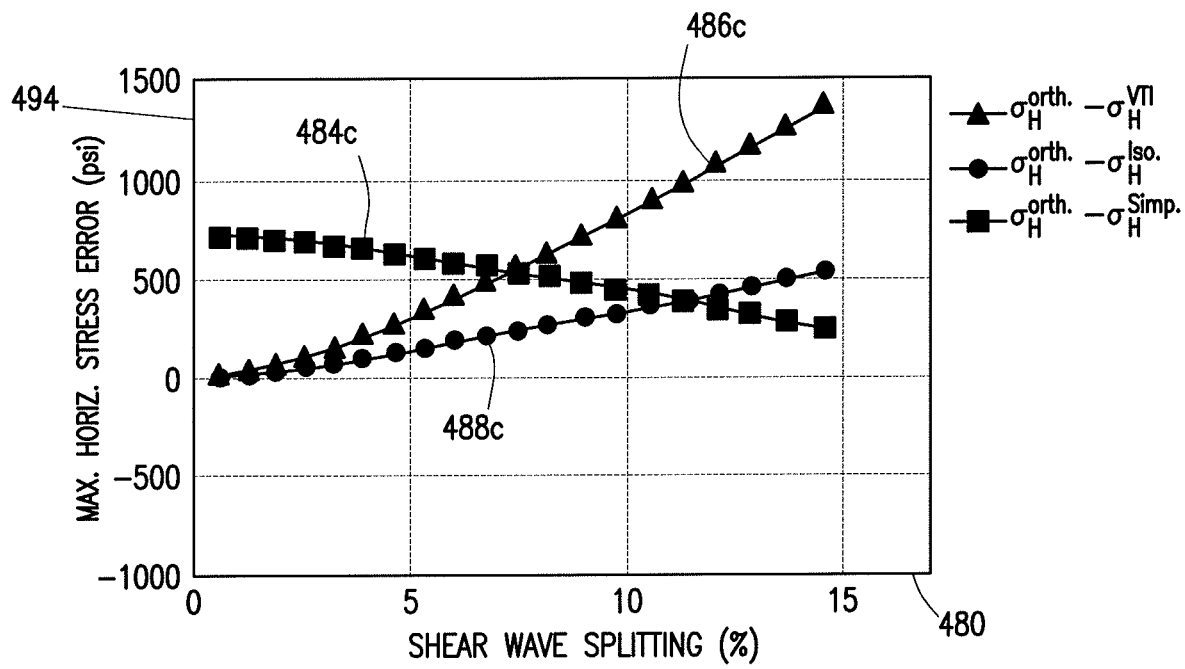
Figure 8D:
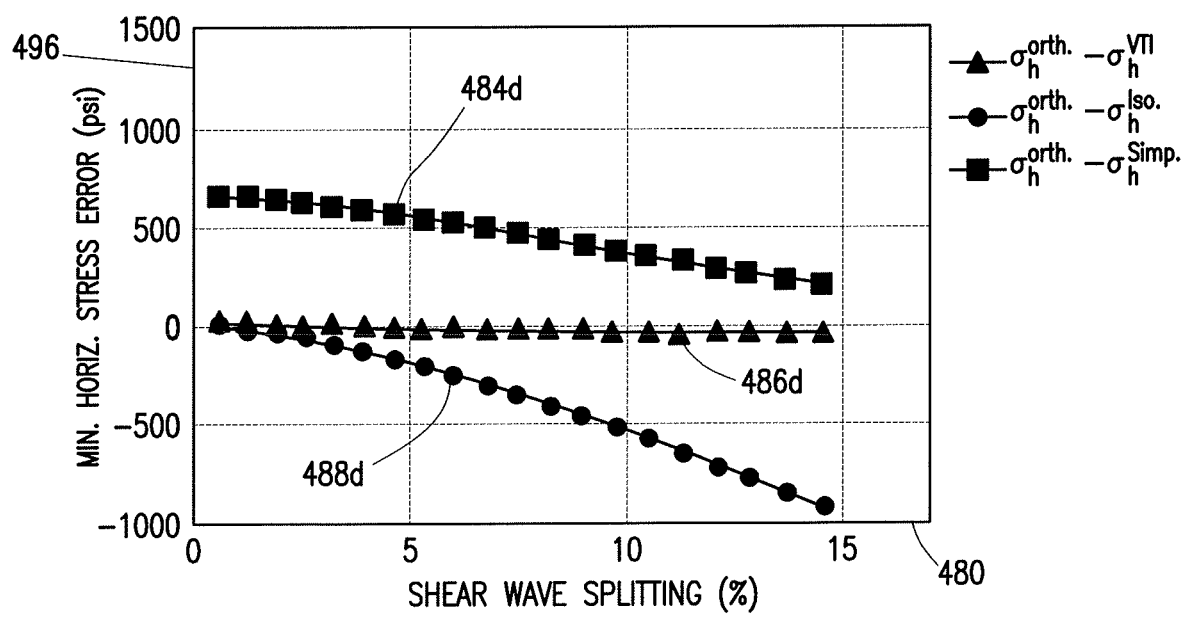
Figure 8E:
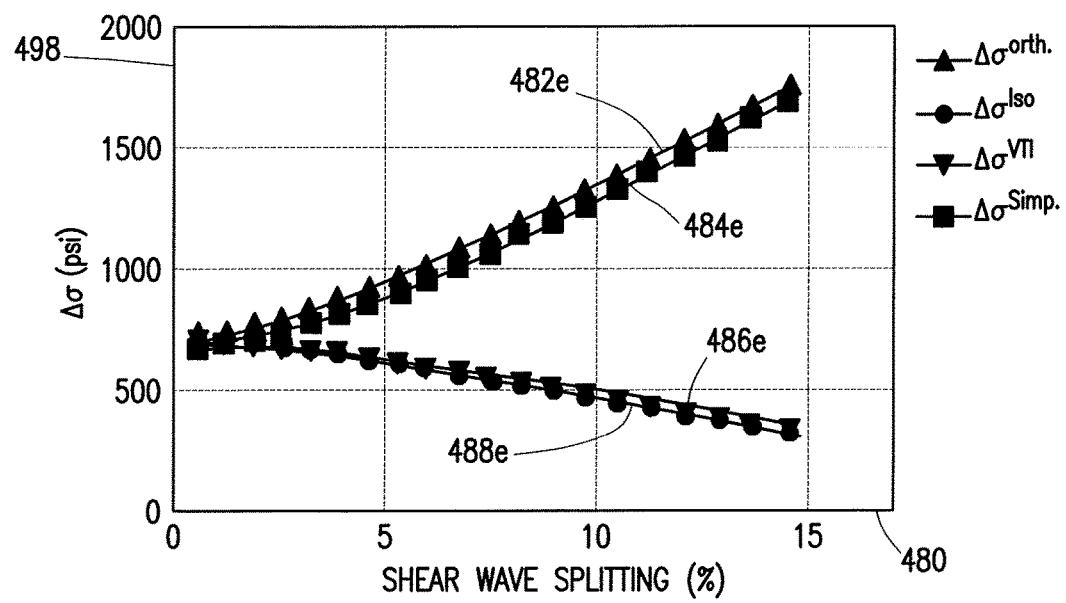
Figure 8F:
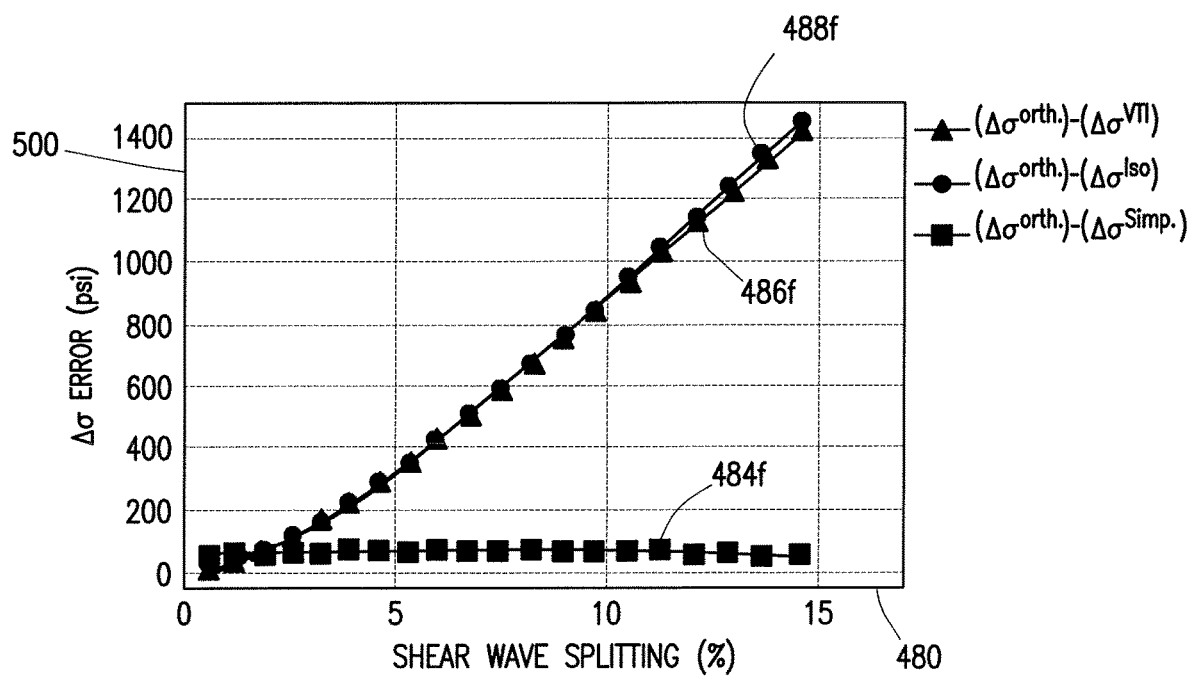

More specifically, FIG. 8A illustrates a maximum horizontal stress 490 for the exact orthorhombic (482a), simplified orthorhombic (484a), VTI (486a), and isotropic (488a) models taken with respect to the SWS 480. FIG. 8B illustrates a minimum horizontal stress 492 for the exact orthorhombic (482b), simplified orthorhombic (484b), VTI (486b), and isotropic (488b) models taken with respect to the SWS 480. FIG. 8C illustrates errors 494 in computing the maximum horizontal stress 490, and FIG. 8D illustrates errors 496 in computing the minimum horizontal stress 492. FIG. 8E illustrates a stress anisotropic magnitude ($\sigma_H$-$\sigma_h$, or $\Delta\sigma$) 498 using the different models, and FIG. 8F illustrates errors 500 in computing the stress anisotropic magnitude 498.

FIGS. 7A-7F and 8A-8F show the results of anisotropic stress calculations for the two datasets discussed above, when the horizontal well is drilled perpendicular to the dominant fractures as shown in FIG. 6. These figures also show the errors (difference from the exact or "full" orthorhombic model) in computing anisotropic stresses when models with reduced complexity such as the VTI, isotropic, or simplified orthorhombic models are used. FIGS. 7A-7F and 8A-8F suggest that at higher fracture densities or SWS values (450, 480), results of the simplified orthorhombic model (454, 484) converge to the exact values of the anisotropic stresses $\sigma_H$ (460, 490) and $\sigma_h$ (462, 492). The minimum horizontal stress $\sigma_h$ (462, 492) may be accurately computed using the simpler VTI model (456b, 486b), while the maximum horizontal stress $\sigma_H$ (460, 490) calculated using the VTI (456a, 486a) or isotropic (458a, 488a) models may result in significant errors. However, the maximum horizontal stress $\sigma_H$ (460, 490) calculation using the simplified orthorhombic model (454a, 484a) converges to the correct values computed using the full orthorhombic model (452, 482). It should be noted that for the calculation of $\sigma_H$ (460, 490), even the isotropic model (458a, 488a) gives a more accurate estimate than the VTI model (456a, 486a). In this case, when the well is perpendicular to the dominant fractures, the isotropic model (458, 488) may generally underestimate $\sigma_H$ (460, 490) and overestimate $\sigma_h$ (462, 492).

As illustrated in FIGS. 7E, 7F, 8E, and 8F, the stress anisotropy ($\sigma_H$-$\sigma_h$, or $\Delta\sigma$) (468, 498) may be underestimated using the VTI model (456e, 486e) and the isotropic model (458e, 488e). However, the simplified orthorhombic model (454e, 484e) may give an accurate measure of the stress anisotropy (468, 498) across all fracture densities (450, 480). It should be noted that computing the stress anisotropy (468, 498) using the simplified orthorhombic model (454e, 484e) may involve determining 6 mechanical properties (e.g., two Young's moduli and four Poisson's ratios).

Figure 9:
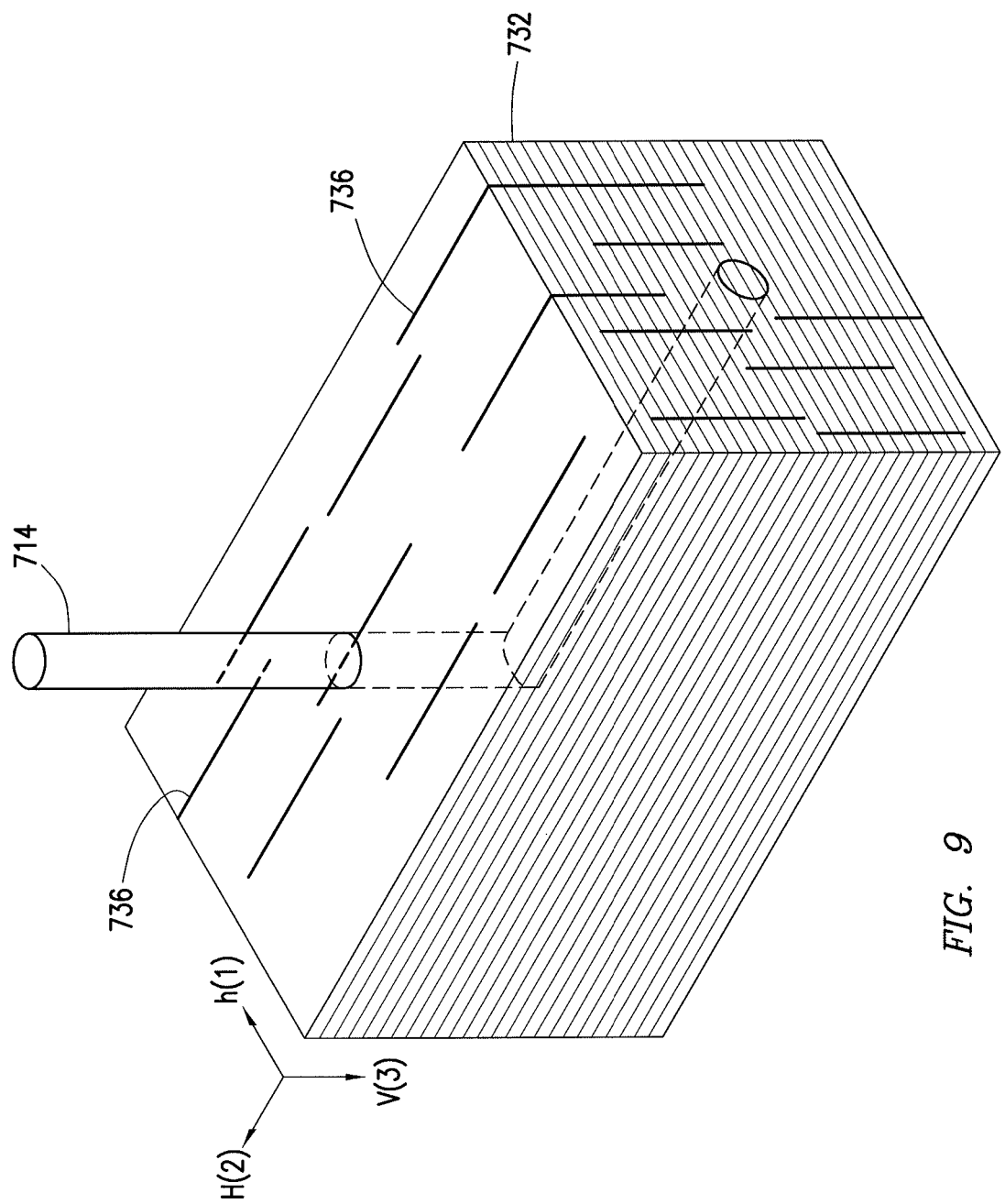
FIG. 9 is an isometric view of a subterranean operation with a horizontal well drilled parallel to the dominant fractures in the formation, in accordance with an embodiment of the present disclosure.

Similar computations may be performed for another well arrangement. As an example of a subterranean operation, FIG. 9 illustrates an isometric view of a subterranean operation with a horizontal well drilled parallel to the dominant fractures in the fractures. A wellbore 714 may be drilled vertically to a predetermined depth and then drilled horizontally through a formation 732 in a direction parallel to dominant fractures 736. The coordinate system shown in FIG. 9 is oriented such that the H-direction corresponds to the direction of the dominant fractures 736. Because the wellbore 714 is drilled parallel to the dominant fractures 736, it may also be parallel to the direction of the maximum horizontal stress, $\sigma_H$.

The stresses calculated by the disclosed simplified geomechanical model where both the fractures 736 and the anisotropic nature of the formation 732 are considered may be compared with other models, as shown in FIGS. 10A-10F and 11A-11F. FIGS. 10A-10F illustrate mechanical properties computed with respect to SWS 750 using $C_{ij}$ components obtained using the first theoretical model of Table 2 (Equation 30). For these calculations, it may be assumed that the horizontal well is drilled parallel to the dominant fractures, as shown in FIG. 9. FIGS. 10A-10F may show stresses calculated for orthorhombic media using the full orthorhombic model (curve 752), the simplified orthorhombic model (curve 754), the VTI model (curve 756), and the isotropic model (curve 758). To calculate the stresses using the VTI model, $C_{22}$ is assumed to be equal to $C_{11}$ and $C_{23}$ is assumed to be equal to $C_{13}$. For the isotropic model, $C_{22}$ is assumed to be equal to $C_{11}$, $C_{23}$ is assumed to be equal to $C_{13}$, $C_{12}$ is assumed to be equal to $C_{13}$, and $C_{33}$ is assumed to be equal to $C_{22}$. For all three models, the properties of formation 732 are assumed to be:

$\sigma_V$=7250 psi;

$P$=3600 psi;

$\varepsilon_h$=0.2 mm;

$\varepsilon_H$=0.4 mm; and $\alpha$=0.7.

Figure 10A:
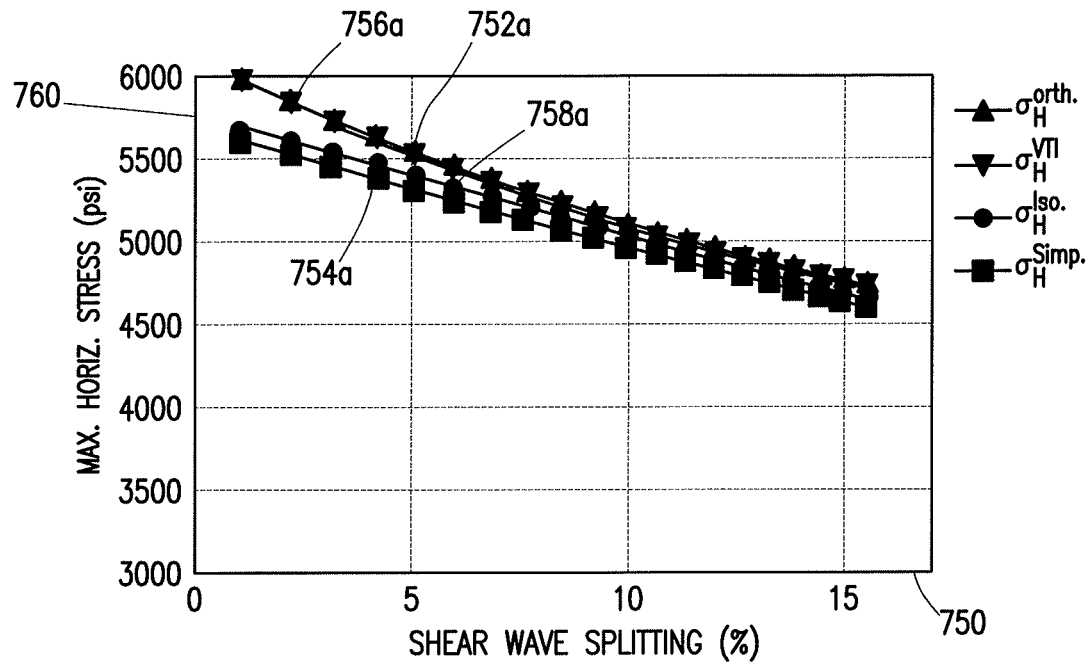
FIGS. 10A-10F are graphs illustrating anisotropic stresses on the formation of FIG. 9 and errors of these anisotropic stresses, in accordance with an embodiment of the present disclosure.
Figure 10B:
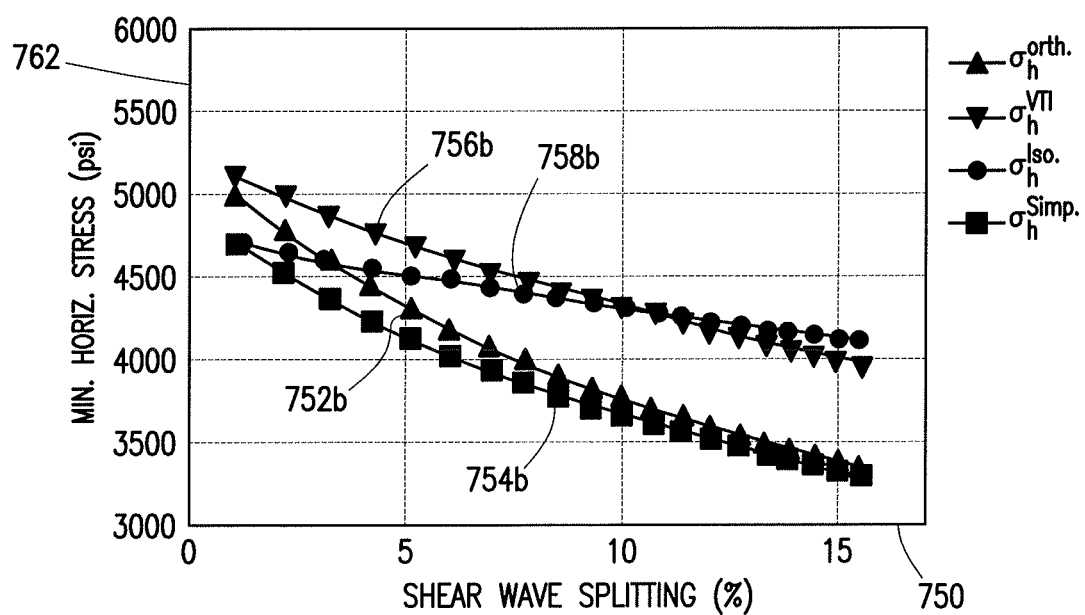
Figure 10C:
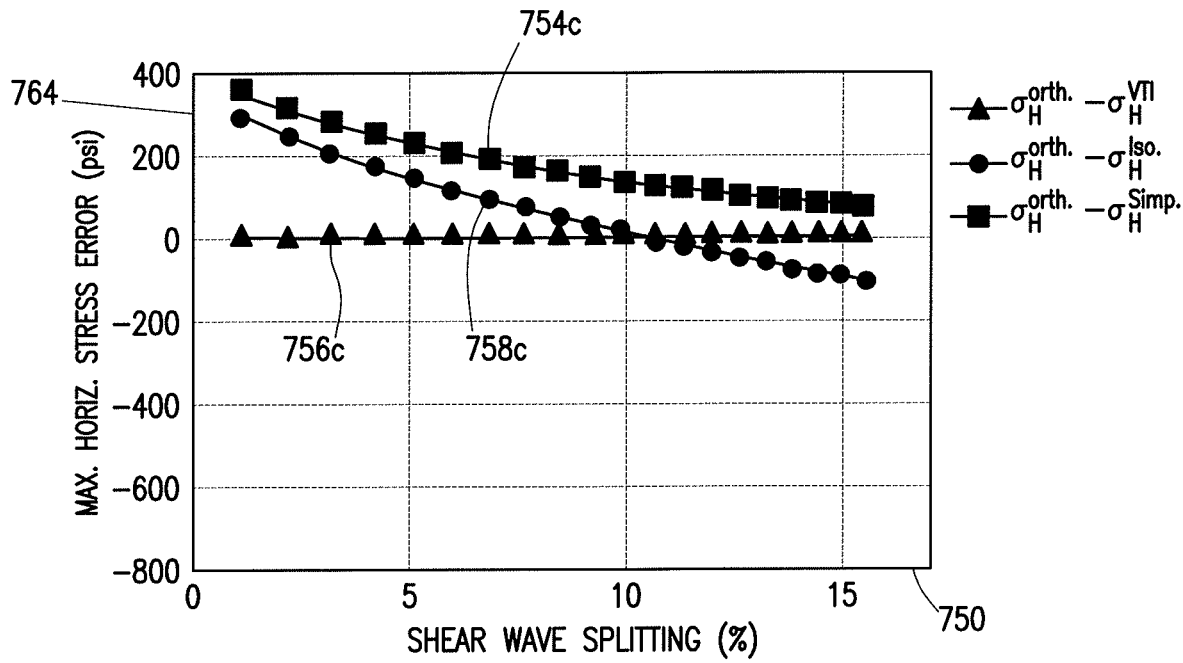
Figure 10D:
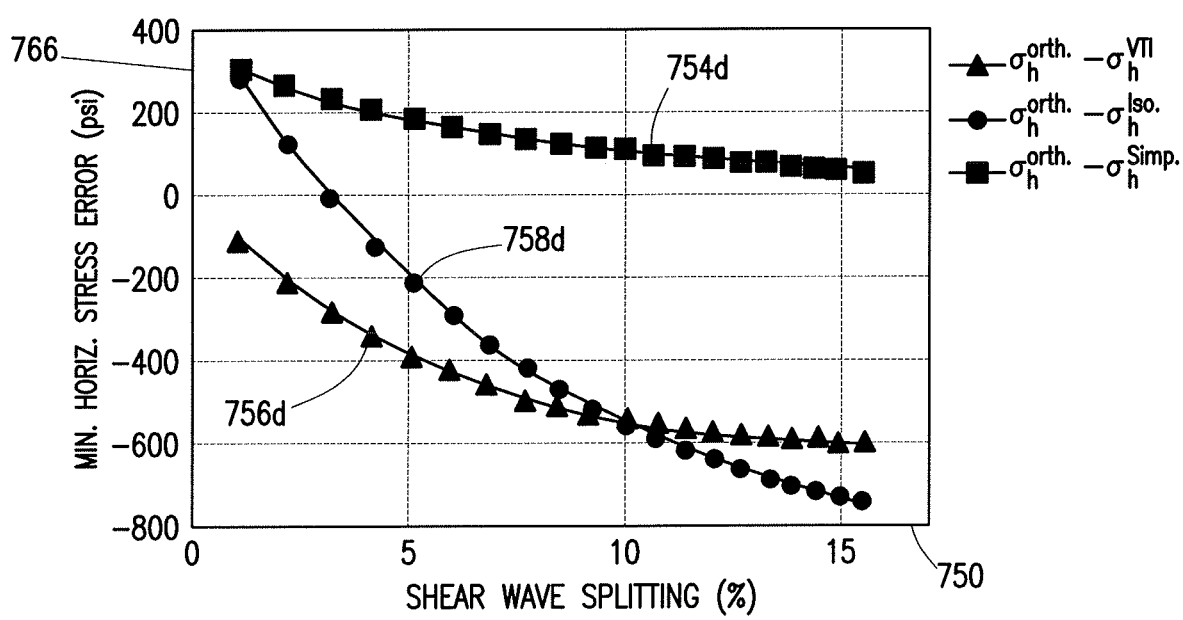
Figure 10E:
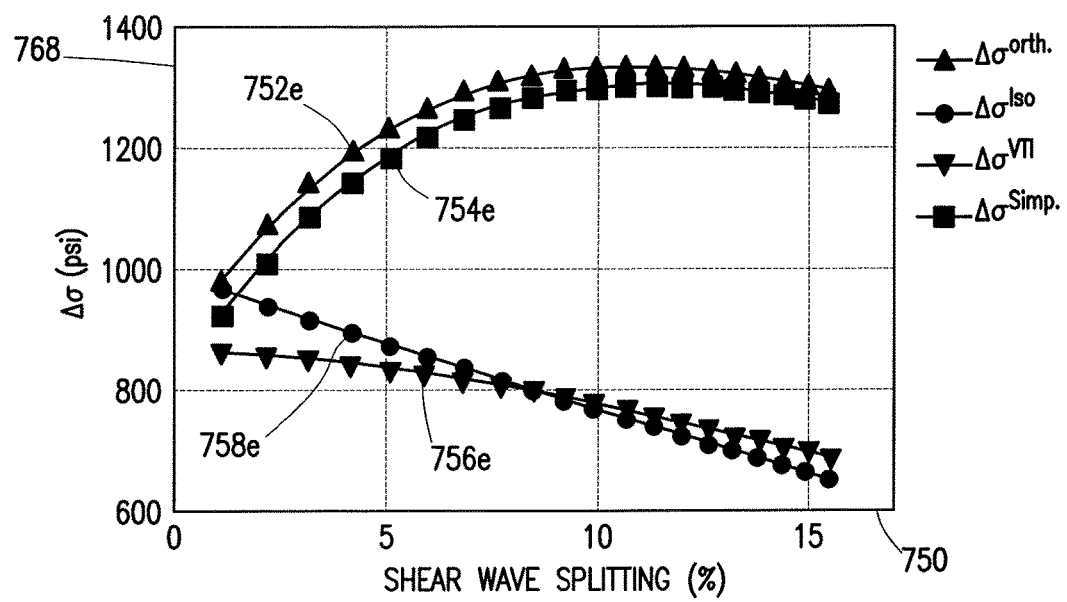
Figure 10F:
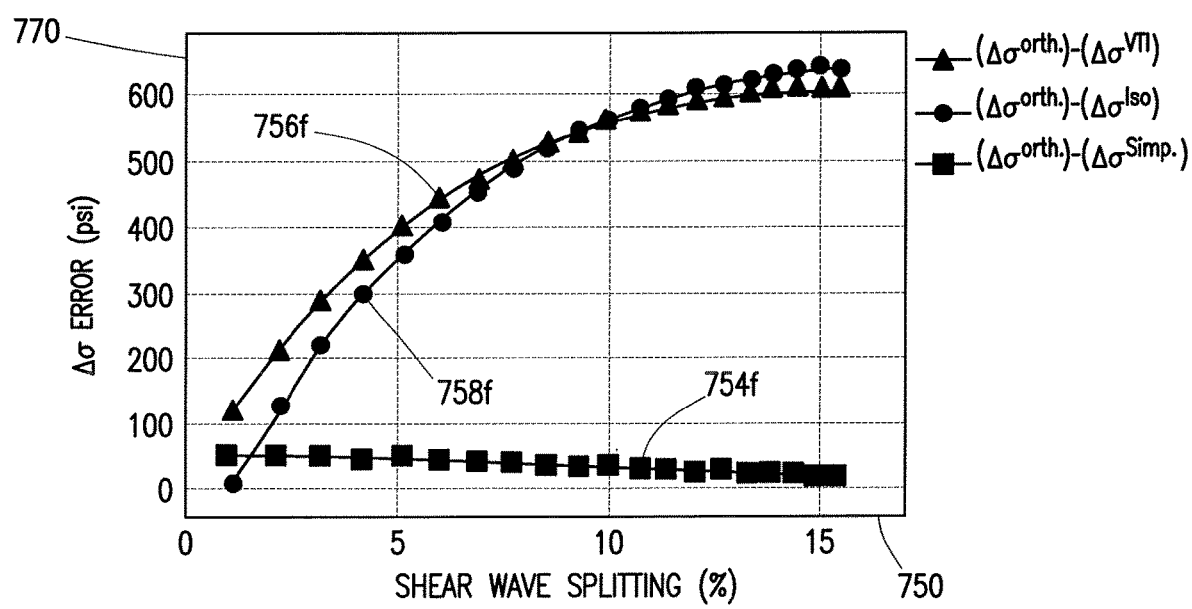

FIG. 10A illustrates a maximum horizontal stress 760 for the different models taken with respect to the SWS 750, and FIG. 10B illustrates a minimum horizontal stress 762 for the different models. FIG. 10C illustrates errors 764 in computing the maximum horizontal stress 760, and FIG. 10D illustrates errors 766 in computing the minimum horizontal stress 762. FIG. 10E illustrates a stress anisotropic magnitude ($\sigma_H$-$\sigma_h$, or $\Delta\sigma$) 768 using the different models, and FIG. 10F illustrates errors 770 in computing the stress anisotropic magnitude 768.

FIGS. 11A-11F illustrate mechanical properties calculated from data obtained using the second theoretical model of Table 3 (Equation 31). For these calculations, it may be assumed that the horizontal well is drilled parallel to the dominant fractures, as shown in FIG. 9. FIGS. 11A-11F may show stresses calculated for orthorhombic media using the full orthorhombic model (curve 782), the simplified orthorhombic model (curve 784), the VTI model (curve 786), and the isotropic model (curve 788).

Figure 11A:
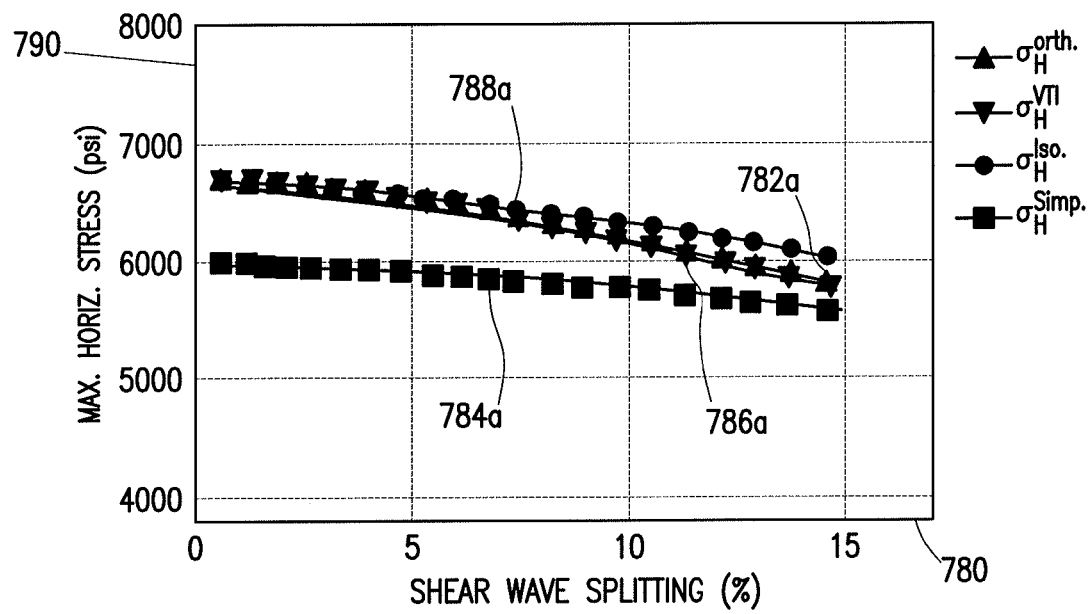
FIGS. 11A-11F are graphs illustrating anisotropic stresses on the formation of FIG. 9 and errors of these anisotropic stresses, in accordance with an embodiment of the present disclosure.
Figure 11B:
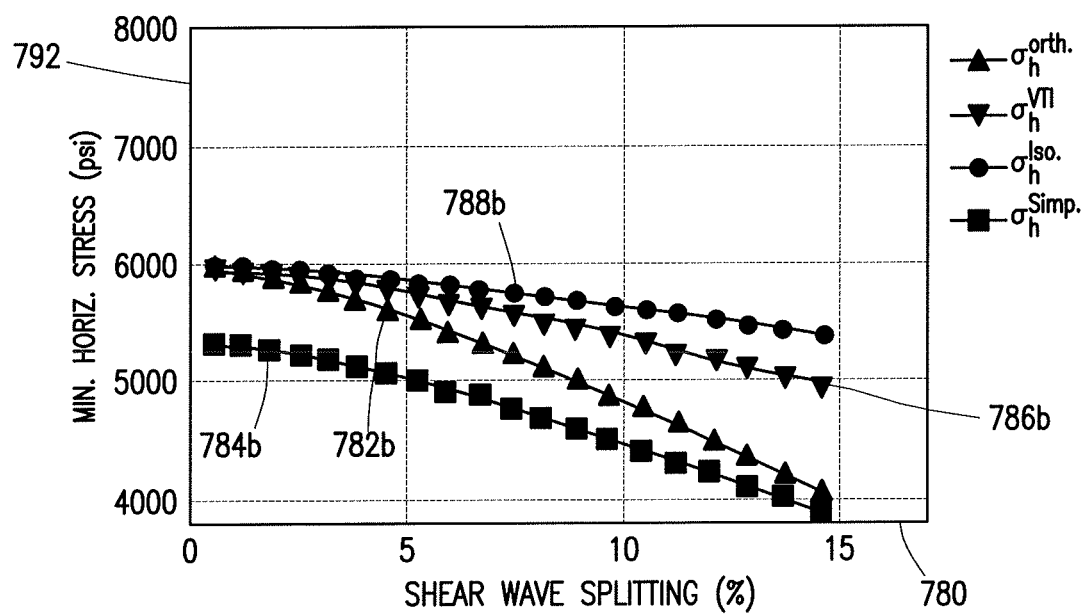
Figure 11C:
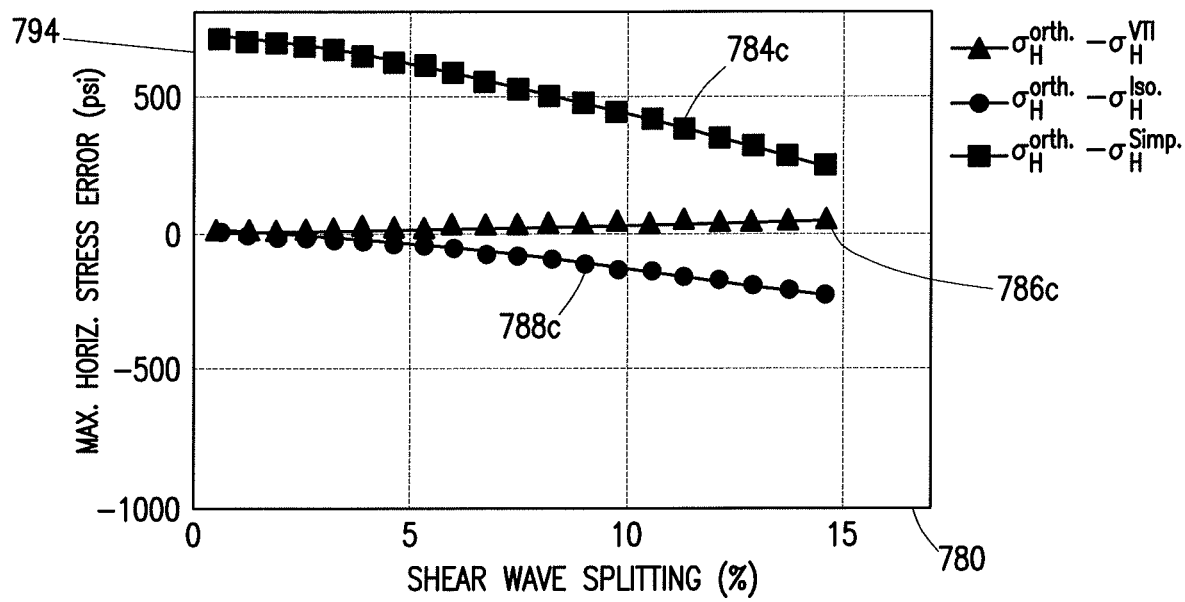
Figure 11D:
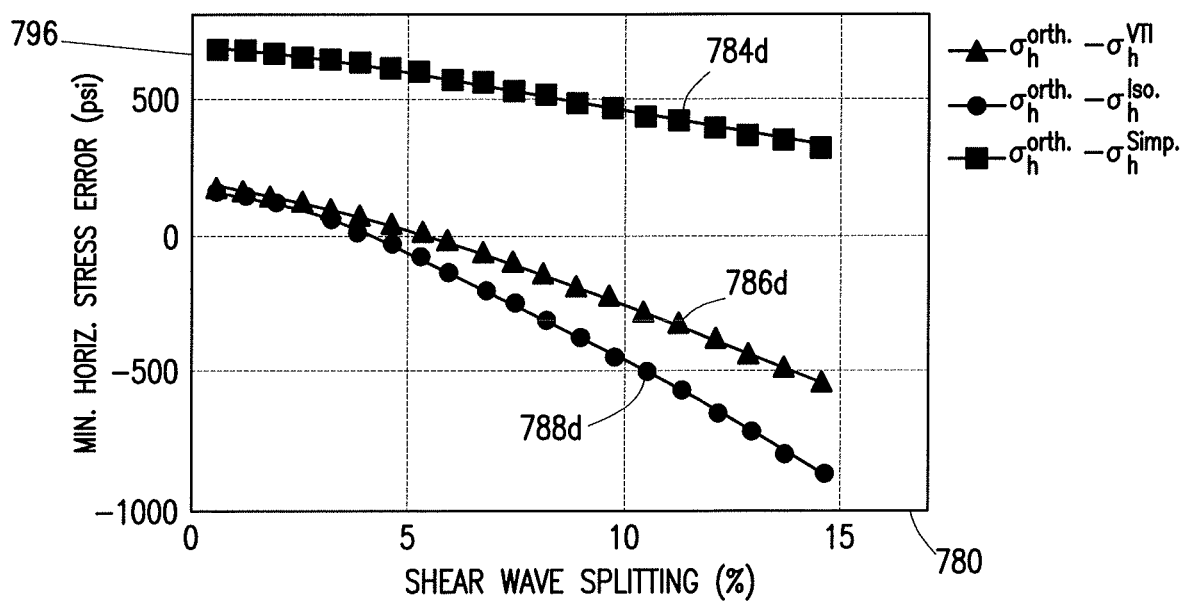
Figure 11E:
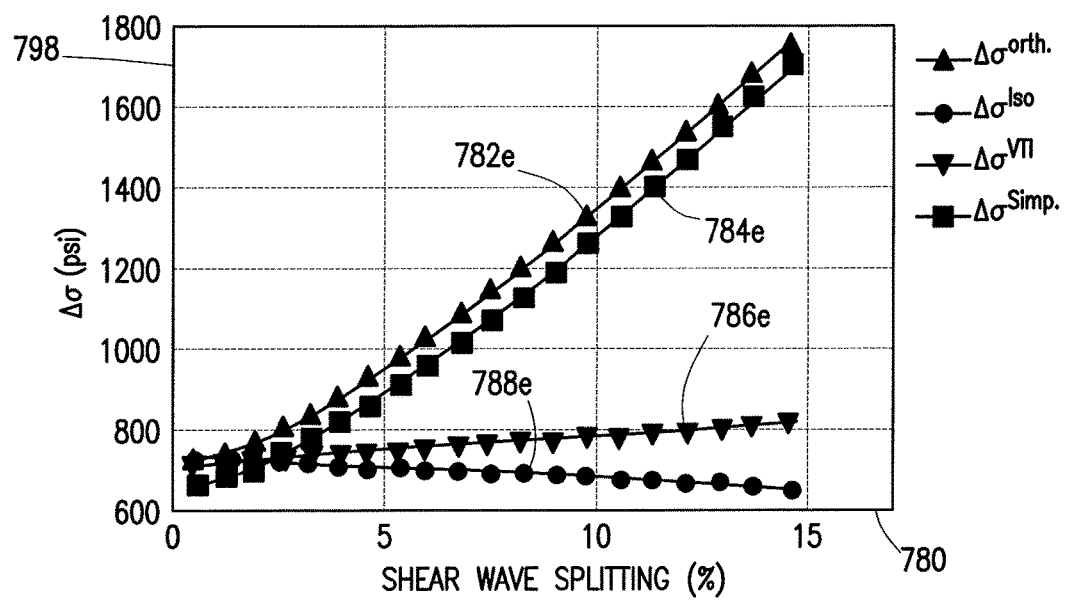
Figure 11F:
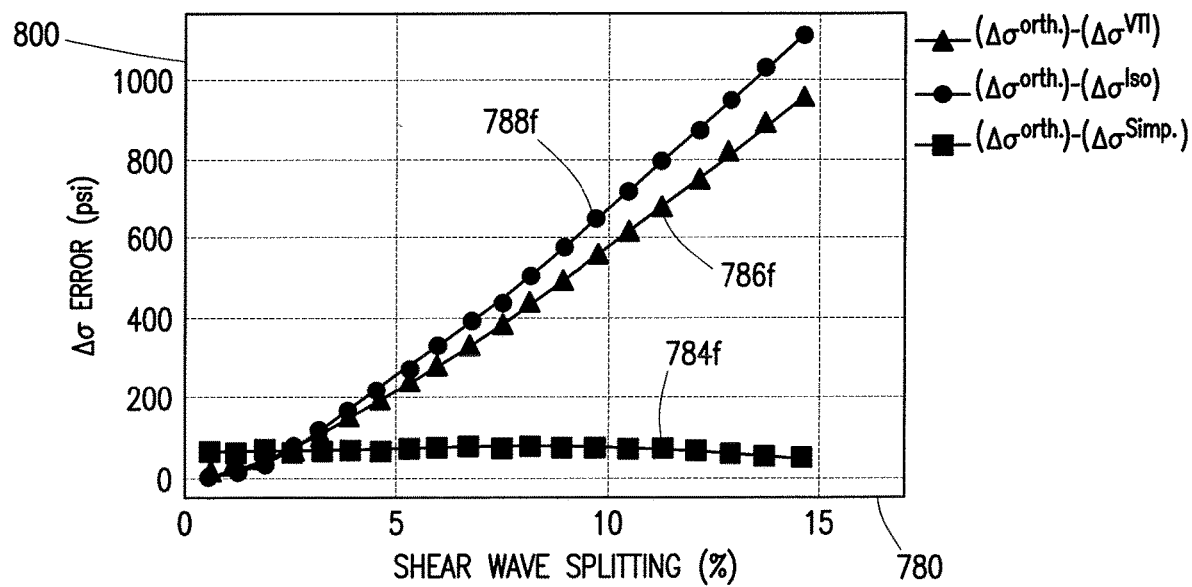

More specifically, FIG. 11A illustrates a maximum horizontal stress 790 for the different models taken with respect to the SWS 780, and FIG. 11B illustrates a minimum horizontal stress 792 for the different models. FIG. 11C illustrates errors 794 in computing the maximum horizontal stress 790, and FIG. 11D illustrates errors 796 in computing the minimum horizontal stress 792. FIG. 11E illustrates a stress anisotropic magnitude ($\sigma_H$-$\sigma_h$, or $\Delta\sigma$) 798 using the different models, and FIG. 11F illustrates errors 800 in computing the stress anisotropic magnitude 798.

FIGS. 10A-10F and 11A-11F show the results of anisotropic stress calculations for the two datasets discussed above, when the horizontal well is drilled parallel to the dominant fractures as shown in FIG. 9. These figures also show the errors (difference from the exact or "full" orthorhombic model) in computing anisotropic stresses when models with reduced complexity such as the VTI, isotropic, or simplified orthorhombic models are used. FIGS. 10A-10F and 11A-11F suggest that at higher fracture densities or SWS values (750, 780), results of the simplified orthorhombic model (754, 784) converge to the exact values of the anisotropic stresses $\sigma_H$ (760, 790) and $\sigma_h$ (762, 792). As expected, the behavior of the anisotropic stresses $\sigma_h$ and $\sigma_H$ are quite different from the case where the horizontal well is drilled perpendicular to the fractures. For the illustrated case (i.e., well parallel to fractures), the minimum horizontal stress $\sigma_h$ (762, 792) may be accurately computed using the simplified orthorhombic model (754b, 784b), while the maximum horizontal stress $\sigma_H$ (760, 790) can be accurately computed using the VTI model (756a, 786a). As illustrated, the isotropic model (758b, 788b) and the VTI model (756b, 786b) may each overestimate $\sigma_h$ (762, 792) at high fracture densities.

As illustrated in FIGS. 10E, 10F, 11E, and 11F, the stress anisotropy ($\sigma_H$-$\sigma_h$, or $\Delta\sigma$) (768, 798) may again be underestimated using the VTI model (756e, 786e) and the isotropic model (758e, 788e). However, the simplified orthorhombic model (754e, 784e) may give an accurate measure of the stress anisotropy (768, 798) across all fracture densities (750, 780).

As noted above, the simplified orthorhombic model may be generated based on sensor measurements taken of a plurality of anisotropic mechanical parameters of the formation. The simplified orthorhombic model may then be used to design a fracturing operation. For example, the simplified orthorhombic model may be used to calculate the minimum horizontal stress, $\sigma_h$, of the formation (e.g., Equation 27). The minimum horizontal stress, $\sigma_h$, which is representative of the fracture closure pressure, may be used to determine the pressure of the fracturing fluid injected into the wellbore (e.g., wellbore 102, 424, or 724 shown in FIGS. 1, 6, and 9, respectively). In some embodiments, this and/or other stresses may be calculated in real-time or in near real-time during the subterranean operation. In other embodiments, the stresses may be calculated prior to the start of the subterranean operation.

In some embodiments, the simplified orthorhombic model determined based on the sensor measurements may be used to construct the coefficients of the stiffness tensor (e.g., Equation 12), and the anisotropic stresses may be computed based on these stiffness coefficients generated from models. The models used to create the stiffness coefficients may be based on information known about the formation (e.g., formation 104, 432, or 732 shown in FIGS. 1, 6, and 9, respectively), and may be calculated prior to the start of the subterranean operation. The calculated stresses may be used to calculate the pressure of the fracturing fluid, which may be calculated prior to the start of the subterranean operation or during the subterranean operation.

Embodiments disclosed herein include:

A. A method including generating a simplified orthorhombic model of a formation to be fractured, based on a plurality of anisotropic mechanical parameters detected for the formation. The method also includes designing a fracturing operation to be performed on the formation based on the simplified orthorhombic model, and fracturing the formation with a fracturing fluid according to the fracturing operation.

B. A system including one or more sensors for detecting a plurality of anisotropic mechanical parameters of a formation. The system also includes a processor for receiving inputs from the one or more sensors, generating a simplified orthorhombic model of the formation based on the plurality of anisotropic mechanical parameters detected by the sensors, and determining a fracture operation based on the simplified orthorhombic model. The system further includes an injection system for injecting fracture fluid into a wellbore to fracture the formation according to the fracture operation.

C. A non-transitory machine-readable medium comprising instructions stored therein, the instructions executable by one or more processors to determine a plurality of anisotropic mechanical parameters of a formation based on sensor measurements taken of the formation, generate a simplified orthorhombic model of the formation based on the plurality of anisotropic mechanical parameters, and design a fracturing operation to be performed on the formation based on the simplified orthorhombic model.

Each of the embodiments A, B, and C may have one or more of the following additional elements in combination: Element 1: further including calculating one or more mechanical properties of the formation based on the simplified orthorhombic model, and designing the fracturing operation based on the one or more mechanical properties. Element 2: wherein the one or more mechanical properties include at least a minimum horizontal stress, and wherein designing the fracturing operation includes determining a pumping pressure for the fracturing fluid based on the minimum horizontal stress. Element 3: further including calculating the minimum horizontal stress according to the equation $\sigma_h = \nu_{hV}\sigma_V + E_h(\varepsilon_h + \nu_{Hh}\varepsilon_H)$. Element 4: further including detecting the plurality of anisotropic mechanical parameters by performing sensor measurements on the formation. Element 5: wherein the sensor measurements include 3 stress/strain measurements of a sample retrieved from the formation. Element 6: wherein the sensor measurements include 6 ultrasonic measurements of the formation taken downhole. Element 7: wherein the plurality of anisotropic mechanical parameters detected for the formation comprise at least a Poisson's ratio and a Young's modulus. Element 8: wherein the formation is a horizontally laminated formation. Element 9: wherein the formation includes a set of natural fractures formed vertically through the formation. Element 10: wherein the set of natural fractures includes a first set of natural fractures and a second set of natural fractures. Element 11: wherein the first set of the natural fractures is orthogonal to the second set of natural fractures.

Element 12: wherein the one or more sensors include ultrasonic sensors for detecting compression and shear wave velocities of the formation. Element 13: wherein the one or more sensors include a stress/strain testing apparatus for detecting stress and strain on a sample of the formation. Element 14: wherein the simplified orthorhombic model is representative of a horizontally laminated formation with at least one vertical set of natural fractures formed therethrough.

Element 15: wherein the instructions are executable by the one or more processors to: generate the simplified orthorhombic model by determining a minimum horizontal stress of the formation based on the plurality of anisotropic mechanical parameters, and design the fracture operation by determining a pumping pressure for injecting fracture fluid into the formation based on the minimum horizontal stress. Element 16: wherein the instructions are executable by the one or more processors to: generate the simplified orthorhombic model by computing coefficients of a stiffness tensor describing the behavior of the formation based on the plurality of anisotropic mechanical parameters.

Although the present disclosure and its advantages have been described in detail, it should be understood that various changes, substitutions and alterations can be made herein without departing from the spirit and scope of the disclosure as defined by the claims.

What is claimed is:

1. A method, comprising:
generating a simplified orthorhombic model of a formation to be fractured, based on a plurality of anisotropic mechanical parameters detected for the formation, wherein generating the simplified orthorhombic model comprises determining a stiffness tensor based on formation data and stiffness coefficient data;

adjusting a fracture density within the simplified orthorhombic model to provide a shear wave splitting between 1% and 15%;
designing a fracturing operation to be performed on the formation based on the simplified orthorhombic model; and
fracturing the formation with a fracturing fluid according to the fracturing operation.

2. The method of claim 1, further comprising:
calculating one or more mechanical properties of the formation based on the simplified orthorhombic model; and
designing the fracturing operation based on the one or more mechanical properties.

3. The method of claim 2, wherein the one or more mechanical properties comprise at least a minimum horizontal stress, and wherein designing the fracturing operation comprises determining a pumping pressure for the fracturing fluid based on the minimum horizontal stress.

4. The method of claim 3, further comprising calculating the minimum horizontal stress according to the equation σh=vhVσV+Eh(εh+vHhεH).

5. The method of claim 1, further comprising detecting the plurality of anisotropic mechanical parameters by performing sensor measurements on the formation.

6. The method of claim 5, wherein the sensor measurements comprise 3 stress/strain measurements of a sample retrieved from the formation.

7. The method of claim 5, wherein the sensor measurements comprise 6 ultrasonic measurements of the formation taken downhole.

8. The method of claim 1, wherein the plurality of anisotropic mechanical parameters detected for the formation comprise at least a Poisson's ratio and a Young's modulus.

9. The method of claim 1, wherein the formation is a horizontally laminated formation.

10. The method of claim 1, wherein the formation comprises a set of natural fractures formed vertically through the formation.

11. The method of claim 10, wherein the set of natural fractures includes a first set of natural fractures and a second set of natural fractures.

12. The method of claim 11, wherein the first set of the natural fractures is orthogonal to the second set of natural fractures.

13. A system, comprising:
one or more sensors for detecting a plurality of anisotropic mechanical parameters of a formation;
a processor for receiving inputs from the one or more sensors, generating a simplified orthorhombic model of the formation based on the plurality of anisotropic mechanical parameters detected by the sensors, wherein generating the simplified orthorhombic model comprises determining a stiffness tensor based on formation data and stiffness coefficient data, adjusting a fracture density within the simplified orthorhombic model to provide a shear wave splitting between 1% and 15%, and determining a fracture operation based on the simplified orthorhombic model; and
an injection system for injecting fracture fluid into a wellbore to fracture the formation according to the fracture operation.

14. The system of claim 13, wherein the one or more sensors comprise ultrasonic sensors for detecting compression and shear wave velocities of the formation.

15. The system of claim 13, wherein the one or more sensors comprise a stress/strain testing apparatus for detecting stress and strain on a sample of the formation.

16. The system of claim 13, wherein the simplified orthorhombic model is representative of a horizontally laminated formation with at least one vertical set of natural fractures formed therethrough.

17. A non-transitory machine-readable medium comprising instructions stored therein, the instructions executable by one or more processors to:
determine a plurality of anisotropic mechanical parameters of a formation based on sensor measurements taken of the formation;
generate a simplified orthorhombic model of the formation based on the plurality of anisotropic mechanical parameters;
determine a stiffness tensor based on formation data and stiffness coefficient data;
adjust a fracture density within the simplified orthorhombic model to provide a shear wave splitting between 1% and 15%; and
design a fracturing operation to be performed on the formation based on the simplified orthorhombic model.

18. The non-transitory machine-readable medium of claim 17, wherein the instructions are executable by the one or more processors to: generate the simplified orthorhombic model by determining a minimum horizontal stress of the formation based on the plurality of anisotropic mechanical parameters, and design the fracture operation by determining a pumping pressure for injecting fracture fluid into the formation based on the minimum horizontal stress.

19. The non-transitory machine-readable medium of claim 17, wherein the instructions are executable by the one or more processors to: generate the simplified orthorhombic model by computing coefficients of a stiffness tensor describing the behavior of the formation based on the plurality of anisotropic mechanical parameters.

20. The non-transitory machine-readable medium of claim 17, wherein the simplified orthorhombic model is representative of a horizontally laminated formation with at least one vertical set of natural fractures formed therethrough.

* * * * *